US009531459B2

United States Patent
Harrison et al.

(10) Patent No.: US 9,531,459 B2
(45) Date of Patent: Dec. 27, 2016

(54) ASSISTANCE INFORMATION FOR ADVANCED RECEIVERS

(71) Applicant: Telefonaktiebolaget L M Ericsson (publ), Stockholm (SE)

(72) Inventors: Mark Harrison, Grapevine, TX (US); George Jöngren, Sundbyberg (SE); Bo Lincoln, Lund (SE); Lars Lindbom, Karlstad (SE); Siva Muruganathan, Sittsville (CA); Stefania Sesia, Roquefort les Pins (FR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/674,989

(22) Filed: Mar. 31, 2015

(65) Prior Publication Data

US 2015/0326290 A1 Nov. 12, 2015

Related U.S. Application Data

(60) Provisional application No. 61/990,931, filed on May 9, 2014.

(51) Int. Cl.
*H04L 27/28* (2006.01)
*H04B 7/04* (2006.01)
(Continued)

(52) U.S. Cl.
CPC .......... *H04B 7/0456* (2013.01); *H04B 7/0473* (2013.01); *H04B 7/0486* (2013.01);
(Continued)

(58) Field of Classification Search
USPC ....... 375/259, 260, 262, 267, 285, 295, 299, 375/340, 347–350; 370/252, 441, 465, 370/479
See application file for complete search history.

(56) References Cited

U.S. PATENT DOCUMENTS

2010/0309861 A1 12/2010 Gorokhov et al.
2012/0082248 A1* 4/2012 Han ..................... H04B 7/0413
375/259
(Continued)

OTHER PUBLICATIONS

Alcatel-Lucent, et al., "R1-140178: Considerations on network signalling for NAICS," 3rd Generation Partnership Project (3GPP), TSG-RAN WG1 Meeting #76, Feb. 10-14, 2014, 3 pages, Prague, Czech Republic.
(Continued)

*Primary Examiner* — Khanh C Tran
(74) *Attorney, Agent, or Firm* — Withrow & Terranova, PLLC

(57) ABSTRACT

Systems and methods relating to assisting a wireless device with suppression of an interfering physical channel during reception of a desired physical channel are disclosed. In some embodiments, a method of operation of a wireless device to assist with suppression of an interfering physical channel during reception of a desired physical channel comprises receiving assistance information for an interfering physical channel and receiving a desired physical channel while suppressing the interfering physical channel according to the assistance information for the interfering physical channel. The assistance information comprises an identity used to generate a reference signal associated with the interfering physical channel and information indicative of one or more transmission constraints on transmission of the interfering physical channel, the one or more transmission constraints comprising a spatial multiplexing rank restriction and/or a precoding matrix restriction.

45 Claims, 25 Drawing Sheets

(51) Int. Cl.
- *H04L 1/00* (2006.01)
- *H04L 5/00* (2006.01)
- *H04B 7/06* (2006.01)

(52) U.S. Cl.
CPC ......... *H04B 7/0639* (2013.01); *H04L 1/0038* (2013.01); *H04L 5/0048* (2013.01)

(56) References Cited

U.S. PATENT DOCUMENTS

| | | | | |
|---|---|---|---|---|
| 2013/0176887 A1* | 7/2013 | Seo | ........................ | H04B 7/024 370/252 |
| 2013/0272250 A1* | 10/2013 | Shimezawa | ............ | H04B 7/063 370/329 |
| 2014/0023157 A1* | 1/2014 | Shimezawa | .......... | H04B 7/0456 375/267 |
| 2014/0140289 A1* | 5/2014 | Moulsley | .............. | H04L 5/0053 370/329 |

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.0.0, 3GPP Organizational Partners, Dec. 2013, 120 pages.

Author Unknown, "Technical Specification Group Radio Access Network; Evolved Universal Terrestrial Radio Access (E-UTRA); Physical layer procedures (Release 12)," Technical Specification 36.213, Version 12.1.0, 3GPP Organizational Partners, Mar. 2014, 186 pages.

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.1.0, 3GPP Organizational Partners, Mar. 2014, 356 pages.

Author Unknown, "Technical Specification Group Radio Access Network; Network-Assisted Interference Cancellation and Suppression for LTE (Release 12)," Technical Report 36.866, Version 1.1.0, 3GPP Organizational Partners, Nov. 2013, 59 pages.

Intel Corporation, "R4-134356: Discussion on network assistance information for enhanced IS/IC receivers," 3rd Generation Partnership Project (3GPP), TSG-RAN WG4 Meeting #68, Aug. 19-23, 2013, 6 pages, Barcelona, Spain.

Intel Corporation, "R1-135125: Discussion on network signaling for NAICS receivers," 3rd Generation Partnership Project (3GPP), TSG-RAN WG1 #75, Nov. 11-15, 2013, 4 pages, San-Francisco, California.

Mediatek Inc., "R1-141488: Higher-layer signalling for NAICS and system impact analysis," 3rd Generation Partnership Project (3GPP), TSG-RAN WG1 #76bis, Mar. 31-Apr. 4, 2014, 8 pages, Shenzhen, China.

Nvidia, "R1-142308: UE category definitions for 256QAM," 3rd Generation Partnership Project (3GPP), TSG-RAN WG1 #77, May 19-23, 2014, 3 pages, Seoul, Korea.

International Search Report and Written Opinion for International Patent Application No. PCT/IB2015/053096, mailed August 12, 2015, 13 pages.

* cited by examiner

```
NeighCellsNAICS-Info-r12  ::=    CHOICE {
    release                          NULL,
    setup                            NAICS-AssistanceInfoList-r12
}

NAICS-AssistanceInfoList-r12 ::=  SEQUENCE    (SIZE    (1..maxCellReport))    OF    NAICS-
AssistanceInfo-r12
NAICS-AssistanceInfo-r12 ::= SEQUENCE {
    nLayer-r12                          ENUMERATED {layer1, layer2},
    naics-scramblingIdentity-r12        INTEGER (0..503),       OPTIONAL,    -- Cond naicsID1
    naics-scramblingIdentity2-r12 INTEGER (0..503),             OPTIONAL,    -- Cond naicsID2
    naics-physCellId-r12                PhysCellId,             OPTIONAL,    -- Cond naicsID3
    pmiList-tm456-r12                   BIT STRING (SIZE (16)), OPTIONAL,
    ...
}
```

*FIG. 13A*

| NAICS-AssistanceInfo field descriptions |
|---|
| neighCellsNAICS-Info |
| This field contains assistance information, used by the UE to mitigate interference from PDSCH while performing data demodulation. |
| naics-scramblingIdentity, naics-scramblingIdentity2 |
| Parameter: $n_{ID}^{(i)}$ used to transmit an interfering PDSCH with transmission modes 8, 9, or 10, see TS 36.211 section 6.10.3.1. |
| naics-physCellId |
| The physical cell ID associated with an interfering PDSCH transmitted using transmission modes 1, 2, 3, 4, 5, or 6. |
| nLayer |
| A UE may assume that at most *nLayer* layers are present on an interfering PDSCH that is transmitted using spatial multiplexing, when that PDSCH is generated using *naics-scramblingIdentity* or *naics-scramblingIdentity2* or is a PDSCH associated with *naics-physCellId*. If the interfering PDSCH uses 4 CRS ports and transmission mode 3, the UE may assume that the interfering PDSCH uses 4 layer spatial diversity or 2 layer spatial multiplexing. Value layer1 corresponds to 1 layer and layer2 corresponds to 2 layers. |
| pmiList |
| A UE may assume that the precoding matrices in *pmiList* are the only ones used on an interfering PDSCH associated with *naics-physCellId* that is transmitted using 4 CRS ports and transmission modes 4, 5, or 6. Parameter *pmiList* corresponds to $a_0...a_{15}$ in *codebookSubsetRestriction*, as defined for transmission mode 4 with 4 antenna ports with $v=1$ layer; see TS 36.213 section 7.2 and TS 36.211 section 6.3.4.2.3. A maximum of *MaxNaicsPMI* bits out of $a_0...a_{15}$ in *pmiList* may be set to 1, and bits $\{a_4 a_5 a_6 a_7\}$ are set to $\{0000\}$. The number of subset restricted precoding matrices is assumed to be the same for layers $v=1$ and $v=2$. |
| MaxNaicsPMI |
| Maximum number of precoding matrices per layer that a UE may assume is used on a PDSCH associated with *naics-physCellID-r12* when the PDSCH uses transmission modes 4, 5, or 6. |

| Conditional presence | Explanation |
|---|---|
| naicsID1 | The field is mandatory present if the *naics-scramblingIdentity2* and *naics-physCellId* are not present, otherwise the field is optionally present, need ON |
| naicsID2 | The field is mandatory present if the *naics-scramblingIdentity* and *naics-physCellId* are not present, otherwise the field is optionally present, need ON |
| naicsID3 | The field is mandatory present if the *naics-scramblingIdentity* and *naics-scramblingIdentity2* are not present, otherwise the field is optionally present, need ON |

*FIG. 13B*

```
NeighCellsNAICS-info-r12 ::=    CHOICE {
    release                         NULL,
    setup                           NAICS-AssistanceInfoList-r12
}

NAICS-AssistanceInfoList-r12 ::= SEQUENCE     (SIZE    (1..maxCellReport))    OF    NAICS-
AssistanceInfo-r12
NAICS-AssistanceInfo-r12 ::= SEQUENCE {
    nLayer-r12                      ENUMERATED {layer1, layer2},
    naics-scramblingIdentity-r12    INTEGER (0..503),    OPTIONAL,    -- Cond naicsID1
    naics-scramblingIdentity2-r12 INTEGER (0..503),    OPTIONAL,    -- Cond naicsID2
    naics-physCellId-r12            PhysCellId,         OPTIONAL,   -- Cond naicsID3
    pmiList-tm456-r12               BIT STRING (SIZE (32)),         OPTIONAL,
    ...
}
```

*FIG. 14A*

| NAICS-AssistanceInfo field descriptions |
| --- |
| neighCellsNAICS-Info<br>This field contains assistance information, used by the UE to mitigate interference from PDSCH while performing data demodulation. |
| naics-scramblingIdentity, naics-scramblingIdentity2<br>Parameter: $n_{ID}^{(i)}$ used to transmit an interfering PDSCH with transmission modes 8, 9, or 10, see TS 36.211 section 6.10.3.1. |
| naics-physCellId<br>The physical cell ID associated with an interfering PDSCH transmitted using transmission modes 1, 2, 3, 4, 5, or 6. |
| nLayer<br>A UE may assume that at most *nLayer* layers are present on an interfering PDSCH that is transmitted using spatial multiplexing, when that PDSCH is generated using *naics-scramblingIdentity* or *naics-scramblingIdentity2* or is a PDSCH associated with *naics-physCellId*. If the interfering PDSCH uses 4 CRS ports and transmission mode 3, the UE may assume that the interfering PDSCH uses 4 layer spatial diversity or 2 layer spatial multiplexing. Value layer1 corresponds to 1 layer and layer2 corresponds to 2 layers. |
| pmiList<br>A UE may assume that the precoding matrices in *pmiList* are the only ones used on an interfering PDSCH associated with *naics-physCellId* that is transmitted using 4 CRS ports and transmission modes 4, 5, or 6. Parameter *pmiList* corresponds to $a_0...a_{16 \times nLayer-1}$ in *codebookSubsetRestriction*, as defined for transmission mode 4 with 4 antenna ports with $v = nLayer$ layers; see TS 36.213 section 7.2 and TS 36.211 section 6.3.4.2.3. A maximum of *MaxNaicsPMI* bits out of $a_0...a_{15}$ in *pmiList* may be set to 1, and bits $\{a_4 a_5 a_6 a_7\}$ are set to $\{0000\}$. Rank 2 PMI matrices are subsets of rank 1 PMI matrices in *pmiList*: when *nLayer* indicates 2 layers, element $a_{16+i}$ with $0 \le i \le 15$ in pmiList may be set to 1 only if $a_i$ is set to 1. |
| MaxNaicsPMI<br>Maximum number of precoding matrices per layer that a UE may assume is used on a PDSCH associated with *naics-physCellID-r12* when the PDSCH uses transmission modes 4, 5, or 6. |

*FIG. 14B*

```
NeighCellsNAICS-Info-r12 ::= CHOICE {
    release           NULL,
    setup             NAICS-AssistanceInfolist-r12
}

NAICS-AssistanceInfolist-r12 ::= SEQUENCE (SIZE (1..maxCellReport)) OF NAICS-AssistanceInfo-r12
NAICS-AssistanceInfo-r12 ::= SEQUENCE {
    nLayer-r12                        ENUMERATED {layer1, layer2},
    naics-scramblingidentity-r12      INTEGER (0..503),      OPTIONAL,   -- Cond naicsID1
    naics-scramblingidentity2-r12     INTEGER (0..503),      OPTIONAL,   -- Cond naicsID2
    naics-physCellid-r12              PhysCellId,            OPTIONAL,   -- Cond naicsID3
    pmiList-tm456-r12                 BIT STRING (SIZE (32)),            OPTIONAL,
    ...
}
```

*FIG. 15A*

| NAICS-AssistanceInfo field descriptions |
|---|
| neighCellsNAICS-Info<br>This field contains assistance information, used by the UE to mitigate interference from PDSCH while performing data demodulation. |
| naics-scramblingIdentity, naics-scramblingIdentity2<br>Parameter: $n_{ID}^{(i)}$ used to transmit an interfering PDSCH with transmission modes 8, 9, or 10, see TS 36.211 section 6.10.3.1. |
| naics-physCellId<br>The physical cell ID associated with an interfering PDSCH transmitted using transmission modes 1, 2, 3, 4, 5, or 6. |
| nLayer<br>A UE may assume that at most *nLayer* layers are present on an interfering PDSCH that is transmitted using spatial multiplexing, when that PDSCH is generated using *naics-scramblingIdentity* or *naics-scramblingIdentity2* or is a PDSCH associated with *naics-physCellId*. If the interfering PDSCH uses 4 CRS ports and transmission mode 3, the UE may assume that the interfering PDSCH uses 4 layer spatial diversity or 2 layer spatial multiplexing. Value layer1 corresponds to 1 layer and layer2 corresponds to 2 layers. |
| pmiList<br>A UE may assume that the precoding matrices in *pmiList* are the only ones used on an interfering PDSCH associated with *naics-physCellId* that is transmitted using 4 CRS ports and transmission modes 4, 5, or 6. Parameter *pmiList* corresponds to $a_0 ... a_{16 \times nLayer - 1}$ in *codebookSubsetRestriction*, as defined for transmission mode 4 with 4 antenna ports with $\upsilon = nLayer$ layers; see TS 36.213 section 7.2 and TS 36.211 section 6.3.4.2.3. Hence, the number of subset restricted precoding matrices can be chosen to be different for $\upsilon = 1$ and $\upsilon = 2$. |
| MaxNaicsPMI<br>Maximum number of precoding matrices per layer that a UE may assume is used on a PDSCH associated with *naics-physCellID-r12* when the PDSCH uses transmission modes 4, 5, or 6. |

*FIG. 15B*

```
NeighCellsNAICS-Info-r12 ::=    CHOICE {
    release                         NULL,
    setup                           NAICS-AssistanceInfoList-r12
}

NAICS-AssistanceInfoList-r12 ::= SEQUENCE (SIZE (1..maxCellReport)) OF NAICS-AssistanceInfo-r12
NAICS-AssistanceInfo-r12 ::= SEQUENCE {
    nLayer-r12                      ENUMERATED {layer1, layer2},
    naics-scramblingIdentity-r12    INTEGER (0..503),       OPTIONAL,  -- Cond naicsID1
    naics-scramblingIdentity2-r12   INTEGER (0..503),       OPTIONAL,  -- Cond naicsID2
    naics-physCellId-r12            PhysCellId              OPTIONAL,  -- Cond naicsID3
    pmiList-tm456-r12               BIT STRING (SIZE (16)), OPTIONAL,
    ...
}
```

*FIG. 16A*

| NAICS-AssistanceInfo field descriptions |
|---|
| neighCellsNAICS-Info <br> This field contains assistance information, used by the UE to mitigate interference from PDSCH while performing data demodulation. |
| naics-scramblingIdentity, naics-scramblingIdentity2 <br> Parameter: $n_{ID}^{(0)}$ used to transmit an interfering PDSCH with transmission modes 8, 9, or 10, see TS 36.211 section 6.10.3.1. The UE may assume that if antenna ports 0-3 of a cell are quasi-collocated with the serving PDSCH with respect to Doppler shift and Doppler spread, they are quasi-collocated with antenna ports 0-3 and 7-10 of the interfering PDSCH with respect to Doppler shift and Doppler spread. |
| naics-physCellId <br> The physical cell ID associated with an interfering PDSCH transmitted using transmission modes 1, 2, 3, 4, 5, or 6. |
| nLayer <br> A UE may assume that at most *nLayer* layers are present on an interfering PDSCH that is transmitted using spatial multiplexing, when that PDSCH is generated using *naics-scramblingIdentity* or *naics-scramblingIdentity2* or is a PDSCH associated with *naics-physCellId*. If the interfering PDSCH uses 4 CRS ports and transmission mode 3, the UE may assume that the interfering PDSCH uses 4 layer spatial diversity or 2 layer spatial multiplexing. Value layer1 corresponds to 1 layer and layer2 corresponds to 2 layers. |
| pmiList <br> A UE may assume that the precoding matrices in *pmiList* are the only ones used on an interfering PDSCH associated with *naics-physCellId* that is transmitted using 4 CRS ports and transmission modes 4, 5, or 6. Parameter *pmiList* corresponds to $a_0...a_{15}$ in *codebookSubsetRestriction*, as defined for transmission mode 4 with 4 antenna ports with $v=1$ layer; see TS 36.213 section 7.2 and TS 36.211 section 6.3.4.2.3. A maximum of *MaxNaicsPMI* bits out of $a_0...a_{15}$ in *pmiList* may be set to 1, and bits $\{a_4 a_5 a_6 a_7\}$ are set to $\{0000\}$. The number of subset restricted precoding matrices is assumed to be the same for layers $v=1$ and $v=2$. |
| MaxNaicsPMI <br> Maximum number of precoding matrices per layer that a UE may assume is used on a PDSCH associated with *naics-physCellID-r12* when the PDSCH uses transmission modes 4, 5, or 6. |

*FIG. 16B*

ASSISTANCE INFORMATION FOR ADVANCED RECEIVERS

RELATED APPLICATIONS

This application claims the benefit of provisional patent application Ser. No. 61/990,931, filed May 9, 2014, the disclosure of which is hereby incorporated herein by reference in its entirety.

TECHNICAL FIELD

The present disclosure relates to assistance information to assist a wireless device to suppress or cancel an interfering physical channel in a cellular communications network.

BACKGROUND

Downlink inter-cell, or co-channel, interference is a major limiting factor on downlink performance in cellular communications networks, such as $3^{rd}$ Generation Partnership Project (3GPP) Long Term Evolution (LTE) networks. Various schemes have been proposed and implemented to address downlink inter-cell interference at the network side (e.g., coordinated scheduling). However, even when using these network side inter-cell interference mitigation schemes, there is a substantial amount of residual downlink inter-cell interference. As such, interference aware receivers have been proposed for User Equipment devices (UE), or terminal, side interference mitigation. These interference aware receivers provide improved performance as compared to conventional receivers that treat downlink inter-cell interference as All White Gaussian Noise (AWGN).

Recently, 3GPP created a new study item for LTE Release 12 on Network Assisted Interference Cancellation and Suppression (NAICS) (see "Network-Assisted Interference Cancellation and Suppression for LTE (Release 12)," 3GPP Technical Report (TR) 36.866 V1.1.0, November 2013.). UEs using NAICS (which are sometimes referred to herein as NAICS UEs or UEs having NAICS receivers) have advanced, often nonlinear, receivers that cancel and/or suppress transmissions from interfering cells. Such UEs may need to determine interference parameters in order to use their advanced reception capabilities. The parameters are determined through assistance signaling and/or by making estimates of (i.e., 'blindly detecting') the interference parameters. The complexity of blind detection generally increases, and the reliability of blind detection degrades, with the number of parameters and the number of possible values of the parameters. Therefore, more complex downlink transmissions such as those using a larger number of Common Reference Signal (CRS) ports can potentially have higher complexity and lower blind detection reliability.

More specifically, NAICS UEs receiving CRS based transmission modes may need to blindly detect at least the rank and precoding matrix used on one or more interfering Physical Downlink Shared Channels (PDSCHs) transmitted from other cells. If the interference is transmitted using two CRS ports, a total of six precoding matrices could be used, namely, four precoding matrices for rank 1 transmission and two precoding matrices for rank 2. However, if the interference is transmitted using four CRS ports, a total of 64 precoding matrices could be used, namely, 16 precoding matrices for each of ranks 1 through 4). Because of this much larger number of precoding matrices in the four CRS port case, the blind detection complexity and/or reliability can be more challenging than for two CRS ports.

NAICS receivers represent an evolution of prior interference cancellation and suppression receivers. The most straightforward class of interference to cancel is that which has a known pattern or slowly varying information content. CRS interference cancellation, standardized in 3GPP LTE Release 11, is an example feature that cancels interference with a known pattern (in this case interference from a physical signal). Common control channel interference cancellation, also specified in 3GPP LTE Release 11, is an example of cancelling interference from a physical channel with slowly varying interference content. NAICS then is a further enhancement that supports interference suppression and/or cancellation of a physical channel with potentially rapidly varying information content (e.g., the PDSCH).

As discussed above, NAICS receivers require blind detection of a number of interference parameters. In the case of a physical channel with potentially rapidly varying information content (e.g., PDSCH in LTE), this blind detection is complex and may suffer from lower than desired reliability, particularly under certain scenarios. As such, there is a need for systems and methods that lower the complexity and increase the reliability of blind detection in a NAICS receiver.

SUMMARY

Systems and methods relating to assisting a wireless device with suppression of an interfering physical channel during reception of a desired physical channel are disclosed. In some embodiments, a method of operation of a wireless device to assist with suppression of an interfering physical channel during reception of a desired physical channel comprises receiving assistance information for an interfering physical channel and receiving a desired physical channel while suppressing the interfering physical channel according to the assistance information for the interfering physical channel. The assistance information comprises an identity used to generate a reference signal associated with the interfering physical channel and information indicative of one or more transmission constraints on transmission of the interfering physical channel, the one or more transmission constraints comprising a spatial multiplexing rank restriction and/or a precoding matrix restriction. In this manner, complexity of detecting one or more transmission parameters used for transmission of the interfering physical channel can be reduced.

In some embodiments, the one or more transmission constraints comprise the spatial multiplexing rank restriction. Further, in some embodiments, the spatial multiplexing rank restriction defines a number of spatial multiplexing layers that the wireless device can assume are, at most, present on the interfering physical channel, where the number of spatial multiplexing layers defined by the spatial multiplexing rank restriction is less than a maximum number of spatial multiplexing layers that could be used to transmit the interfering physical channel.

In some embodiments, the one or more transmission constraints comprise the precoding matrix restriction. Further, in some embodiments, the precoding matrix restriction defines a subset of a set of precoding matrices. The set of precoding matrices comprises all precoding matrices that could be used to transmit the interfering physical channel. The subset of the set of precoding matrices is less than all precoding matrices in the set of precoding matrices and defining precoding matrices that the wireless device can assume are the only precoding matrices that can be used for transmission of the interfering physical channel.

In some embodiments, the one or more transmission constraints comprise the spatial multiplexing rank restriction and the precoding matrix restriction.

In some embodiments, the one or more transmission constraints further comprise a transmission mode constraint.

In some embodiments, the identity is a physical cell identity. In other embodiments, the identity is a scrambling identity.

In some embodiments, the interfering physical channel is an interfering Long Term Evolution (LTE) Physical Downlink Shared Channel (PDSCH) and the desired physical channel is a desired PDSCH. Further, in some embodiments, receiving the assistance information comprises receiving the assistance information via Radio Resource Control (RRC) signaling.

In some embodiments, the one or more transmission constraints comprise the spatial multiplexing rank restriction and the precoding matrix restriction, and receiving the desired physical channel while suppressing the interfering physical channel according to the assistance information for the interfering physical channel comprises forming a channel estimate of one or more interfering Common Reference Signal (CRS) ports using a physical cell identity that corresponds to the identity of the interfering PDSCH; detecting a Precoding Matrix Indicator (PMI) and a spatial multiplexing rank of the interfering PDSCH using the precoding matrix restriction, the spatial multiplexing rank restriction, and the channel estimate; and receiving the desired PDSCH while suppressing the interfering PDSCH according to the PMI and the spatial multiplexing rank of the interfering PDSCH detected using the precoding matrix restriction, the spatial multiplexing rank restriction, and the channel estimate.

In some embodiments, the one or more transmission constraints further comprise a transmission mode constraint associated with the identity, and the method further comprises determining whether one or more transmission modes that can be used for transmission of the interfering physical channel as indicated by the transmission mode constraint can use PMI feedback. Forming the channel estimate, detecting at least one of the PMI and the spatial multiplexing rank of the interfering PDSCH, and receiving the desired PDSCH while suppressing the interfering PDSCH are performed upon determining that the one or more transmission modes associated with the identity can use PMI feedback.

In some embodiments, the one or more transmission constraints comprise a spatial multiplexing rank restriction, and receiving the desired physical channel while suppressing the interfering physical channel according to the assistance information for the interfering physical channel comprises: forming a channel estimate using a scrambling identity of one or more interfering Demodulation Reference Signal (DMRS) ports, where the scrambling identity corresponds to the identity used to generate DMRS associated with the interfering PDSCH; detecting a spatial multiplexing rank of the interfering PDSCH using the spatial multiplexing rank restriction and the channel estimate; and receiving the desired PDSCH while suppressing the interfering PDSCH according to the spatial multiplexing rank of the interfering PDSCH detected using the spatial multiplexing rank restriction and the channel estimate.

In some embodiments, the interfering physical channel is assumed by the wireless device to be quasi-co-located at least with respect to Doppler shift and Doppler spread with the desired physical channel.

Embodiments of a wireless device that operates according to any of the embodiments described above are also disclosed.

Embodiments of a method of operation of a radio access node to assist with suppression of an interfering physical channel during reception of a desired physical channel at a wireless device are also disclosed. In some embodiments, the method of operation of the radio access node comprises transmitting assistance information to the wireless device for an interfering physical channel. The assistance information comprises an identity used to generate a reference signal associated with the interfering physical channel and information indicative of one or more transmission constraints on transmission of the interfering physical channel, the one or more transmission constraints comprising at least one of a group consisting of: a spatial multiplexing rank restriction and a precoding matrix restriction.

In some embodiments, the one or more transmission constraints comprise the spatial multiplexing rank restriction. Further, in some embodiments, the spatial multiplexing rank restriction defines a number of spatial multiplexing layers that the wireless device can assume are, at most, present on the interfering physical channel, where the number of spatial multiplexing layers defined by the spatial multiplexing restriction is less than a maximum number of spatial multiplexing layers that could be used to transmit the interfering physical channel. In some embodiments, the interfering physical channel is a DMRS based PDSCH, and the one or more transmission constraints do not comprise the precoding matrix restriction.

In some embodiments, the one or more transmission constraints comprise the precoding matrix restriction. Further, in some embodiments, the precoding matrix restriction defines a subset of a set of precoding matrices. The set of precoding matrices comprises all precoding matrices that could be used to transmit the interfering physical channel. The subset of the set of precoding matrices is less than all precoding matrices in the set of precoding matrices and defines precoding matrices that the wireless device can assume are the only precoding matrices that can be used for transmission of the interfering physical channel. In some embodiments, the set of precoding matrices comprises precoding matrices with a scaling factor of $\sqrt{2}/2$, and the subset of the set of precoding matrices excludes the precoding matrices with the scaling factor of $\sqrt{2}/2$.

In some embodiments, the interfering physical channel is a CRS based PDSCH.

In some embodiments, the one or more transmission constraints comprise the spatial multiplexing rank restriction and the precoding matrix restriction. Further, in some embodiments, the spatial multiplexing rank restriction and the precoding matrix restriction are such that precoding matrix indices in rank n are a subset of PMIs in rank n+1.

In some embodiments, the one or more transmission constraints further comprise a transmission mode constraint associated with the identity.

In some embodiments, the identity is a physical cell identity. In other embodiments, the identity is a scrambling identity.

In some embodiments, the interfering physical channel is an interfering LTE PDSCH, and the desired physical channel is a desired PDSCH.

In some embodiments, transmitting assistance information comprises transmitting the assistance information via RRC signaling.

In some embodiments, a method of operation of a first radio access node in a cellular communications network to assist suppression of an interfering physical channel transmitted by a second radio access node during reception of a desired physical channel at a wireless device served by the first radio access node comprises: obtaining inter-node assistance information from the second radio access node from which the interfering physical channel is transmitted, the inter-node assistance information comprising information indicative of one or more transmission constraints on transmission of the interfering physical channel by the second radio access node; and transmitting wireless device assistance information to the wireless device for the interfering physical channel, the wireless device assistance information comprising information indicative of the one or more transmission constraints on transmission of the interfering physical channel by the second radio access node.

In some embodiments, the inter-node assistance information further comprises an identity used to generate a reference signal associated with the interfering physical channel.

In some embodiments, the one or more transmission constraints comprise a spatial multiplexing rank restriction and/or a precoding matrix restriction.

In some embodiments, the one or more transmission constraints comprise a transmission mode constraint.

In some embodiments, a method of operation of a first radio access node in a cellular communications network to assist suppression of a physical channel transmitted by the first radio access node during reception of a desired physical channel at a wireless device served by a second radio access node comprises determining transmission constraints for wireless devices served by the first radio access node and providing, to the second radio access node, inter-node assistance information for suppression of the physical downlink channel as interference during reception at a wireless device served by the second radio access node. The inter-node assistance information provided to the second radio access node comprises information indicative of the transmission constraints for wireless devices served by the first radio access node.

In some embodiments, the transmission constraints comprise a spatial multiplexing rank restriction for a physical downlink channel transmitted by the radio access node and/or a precoding matrix restriction for the physical channel transmitted by the radio access node.

In some embodiments, the inter-node assistance information further comprises an identity used to generate a reference signal associated with the physical downlink channel transmitted by the radio access node.

In some embodiments, the method further comprises transmitting the physical downlink channel from the first radio access node according to the one or more transmission constraints on transmission of the physical downlink channel.

In some embodiments, the method further comprises transmitting the physical downlink channel from the first radio access node in a manner different from the one or more transmission constraints on transmission of the physical downlink channel.

Embodiments of a radio access node that operates according to any of the embodiments above are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 13A and 13B illustrate assistance information for assisting a UE with suppression or cancellation of an interfering physical channel according to some embodiments of the present disclosure;

FIGS. 14A and 14B illustrate assistance information for assisting a UE with suppression or cancellation of an interfering physical channel according to other embodiments of the present disclosure;

FIGS. 15A and 15B illustrate assistance information for assisting a UE with suppression or cancellation of an interfering physical channel according to other embodiments of the present disclosure;

FIGS. 16A and 16B illustrate assistance information for assisting a UE with suppression or cancellation of an interfering physical channel according to other embodiments of the present disclosure;

DETAILED DESCRIPTION

Figure 1:
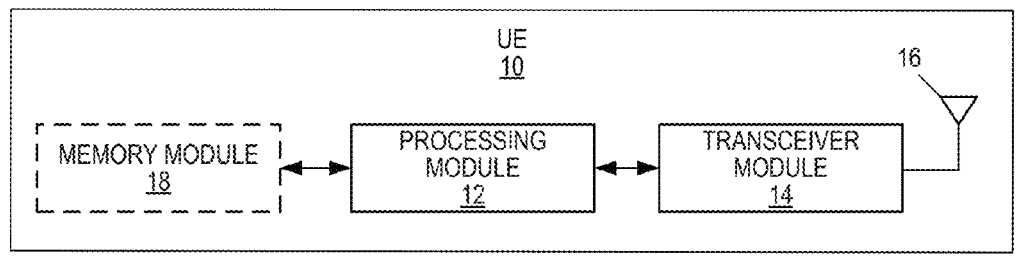
FIG. 1 is a block diagram of a User Equipment device (UE) according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical, or other form of propagated signals—such as carrier waves, infrared signals). In addition, such electronic devices include hardware such as a set of one or more processors coupled to one or more other components, such as one or more non-transitory machine-readable media (to store code and/or data), user input/output devices (e.g., a keyboard, a touch-screen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the disclosure may be implemented using different combinations of software, firmware, and/or hardware.

As used herein, a network device or apparatus (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, quality of service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, User Equipment devices (UEs), terminals, portable media players, Global Positioning System (GPS) units, gaming systems, set-top boxes) access content/services provided over the Internet and/or content/services provided on Virtual Private Networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations). One of ordinary skill in the art will realize that any network device, end station, or other network apparatus can perform the functions described herein.

The following terminologies are described in various embodiments:

Network node: In some embodiments, a more general term "network node" is used and it can correspond to any type of radio network node or any network node, which communicates with a UE and/or with another network node. Examples of network nodes are a Node B, a base station, a Multi-Standard Radio (MSR) radio node such as a MSR base station, an enhanced or evolved Node B (eNB), a network controller, a Radio Network Controller (RNC), a Base Station Controller (BSC), a relay, a donor node controlling relay, a Base Transceiver Station (BTS), an Access Point (AP), transmission points, transmission nodes, a remote radio unit (RRU), a remote radio head (RRH), nodes in a Distributed Antenna System (DAS), a core network node (e.g., a Mobile Switching Centre (MSC), a Mobility Management Entity (MME), etc.), Operation and Management (O&M), an Operations Support System (OSS), a Self-Organizing Network (SON), a positioning node (e.g., an Evolved Serving Mobile Location Centre (E-SMLC)), Minimization of Drive Tests (MDT), etc.

User equipment: In some embodiments, the non-limiting term UE is used and it refers to any type of wireless device communicating with a network node and/or with another UE in a cellular or mobile communications system. Examples of a UE are a target device, a Device-to-Device (D2D) UE, a machine type UE or a UE capable of Machine-to-Machine (M2M) communication, a Personal Digital Assistant (PDA), an iPAD, a tablet, mobile terminals, a smart phone, Laptop Embedded Equipment (LEE), Laptop Mounted Equipment (LME), Universal Serial Bus (USB) dongles, etc.

It should be noted that although terminology from 3$^{rd}$ Generation Partnership Project (3GPP) Long Term Evolution (LTE) has been used in this disclosure to exemplify the embodiments described herein, this should not be seen as limiting the scope of the disclosure to only the aforementioned system. Other wireless systems, including Wideband Code Division Multiple Access (WCDMA), High Speed Packet Access (HSPA), WiMax, WiFi, Wireless Local Area Network (WLAN), and Global System for Mobile Communications (GSM)/GSM Enhanced Data Rates for GSM Evolution (EDGE) Radio Access Network (GERAN), may also benefit from exploiting the scope of this disclosure.

Also note that terminology such as eNB and UE should be considered non-limiting and does in particular not imply a certain hierarchical relation between the two; in general "eNB" could be considered as device 1 and "UE" device 2, and these two devices communicate with each other over some radio channel.

The embodiments described herein after can be implemented in a network node and a UE. Some embodiments are described for a specific deployment scenario such as a LTE heterogeneous network deployment. However these embodiments can be applied and implemented in nodes (UE and network node) of any type of radio access technology and also in any type of network deployment scenario. For example the embodiments can also be applied in a homogeneous network deployment where all network nodes are of the same base station power class, e.g., all are High Power Nodes (HPNs) or all are Low Power Nodes (LPNs). In a heterogeneous network deployment, the network nodes consist of mixture of HPN and LPN. Furthermore, the embodiments are also applicable to heterogeneous or homogenous network deployment based on other technologies such as WCMDA/HSPA, GSM/GERAN/EDGE, Code Division Multiple Access 2000 (CDMA2000)/High Rate Packed Data (HRPD), WLAN, or similar wireless communication technologies.

The embodiments use a generic term 'network node' that may be an eNB, a Node B, a base station, a BTS, a wireless AP, a BSC, a RNC, a relay, a donor node controlling relay, a BTS, transmission points, transmission nodes, a RRU, a RRH, nodes in a DAS, a core network node, a MME, a UE, etc.

The embodiments also use a generic term 'UE'. However a UE can any type of wireless device capable of doing wireless communication such as a sensor, a modem, a smart phone, a Machine-Type Communications (MTC) device aka a M2M device, a D2D UE, a PDA, an iPAD, a tablet, LEE, LME, USB dongles, etc.

FIG. 1 is a block diagram of a UE 10, according to one exemplary embodiment, that can be used in one or more of the non-limiting example embodiments described. The UE 10 may in some embodiments be a mobile device that is configured for M2M or MTC. The UE 10 comprises a processing module 12 that controls the operation of the UE 10. As will be appreciated by one of ordinary skill in the art, the processing module 12 includes one or more processors (e.g., Central Processing Units (CPUs), Application Specific Integrated Circuits (ASICs), and/or Field Programmable Gate Arrays (FPGAs)). The processing module 12 is connected to a receiver or transceiver module 14 with associated antenna(s) 16 which are used to receive signals from or both transmit signals to and receive signals from a base station in a cellular communications network. As will be appreciated by one of ordinary skill in the art, the transceiver module 14 includes one or more transmitters and/or one or more receivers, each of which includes corresponding circuitry (e.g., filters, mixers, amplifiers, etc.). To make use of Discontinuous Reception (DRX), the processing module 12 can be configured to deactivate the receiver or transceiver module 14 for specified lengths of time. The UE 10 also comprises, in some embodiments, a memory module 18 that is connected to the processing module 12 and that stores program and other information and data required for the operation of the UE 10. In some embodiments, the UE 10 may optionally comprise a satellite positioning system (e.g., GPS) receiver module (not shown) that can be used to determine the position and speed of movement of the UE 10.

Figure 2:
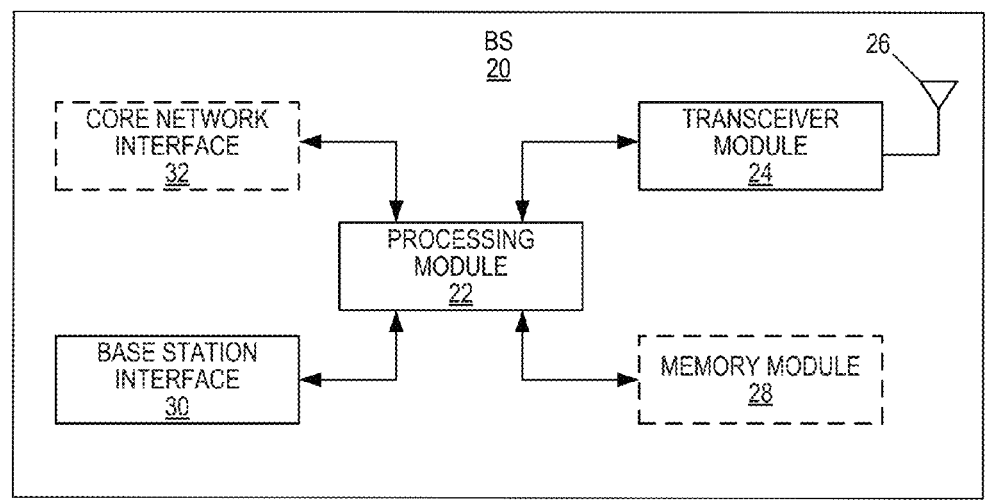
FIG. 2 is a block diagram of a base station according to some embodiments of the present disclosure.

FIG. 2 shows a base station 20 (for example a Node B or an eNB) that can be used in example embodiments described. It will be appreciated that although a macro cell base station (e.g., a macro eNB) will not in practice be identical in size and structure to small cell base station (e.g., a micro eNB), for the purposes of illustration, macro cell and small cell base stations are assumed to include similar components, which are illustrated generally with respect to the base station 20. Thus, the base station 20 comprises a processing module 22 that controls the operation of the base station 20. As will be appreciated by one of ordinary skill in the art, the processing module 22 includes one or more processors (e.g., CPUs, ASICs, and/or FPGAs). The processing module 22 is connected to a transceiver module 24 with associated antenna(s) 26 which are used to transmit signals to, and receive signals from, UEs 10 in the cellular communications network. As will be appreciated by one of ordinary skill in the art, the transceiver module 24 includes one or more transmitters and/or one or more receivers, each of which includes corresponding circuitry (e.g., filters, mixers, amplifiers, etc.). The base station 20 also comprises, in some embodiments, a memory module 28 that is connected to the processing module 22 and that stores program and other information and data required for the operation of the base station 20. The base station 20 also includes components and/or circuitry 30 (e.g., a base station interface) for allowing the base station 20 to exchange information with other base stations 20 (for example via an X2 interface) and components and/or circuitry 32 (e.g., a core network interface) for allowing the base station 20 to exchange information with nodes in a core network of the cellular communications network (for example via an S1 interface). It will be appreciated that base stations for use in other types of networks (e.g., a Universal Terrestrial Radio Access Network (UTRAN) or a WCDMA Radio Access Network (RAN)) will include similar components to those shown in FIG. 2 and appropriate interface circuitry 30, 32 for enabling communications with the other network nodes in those types of networks (e.g., other base stations, mobility management nodes, and/or nodes in the core network).

The described embodiments are applicable to single carrier as well as to multicarrier or Carrier Aggregation (CA) operation of the UE in which the UE is able to receive and/or transmit data to more than one serving cell. The term CA is also called (e.g., interchangeably called) "multi-carrier system," "multi-cell operation," "multi-carrier operation," and "multi-carrier" transmission and/or reception. In CA, one of the Component Carriers (CCs) is the Primary Component Carrier (PCC) or simply primary carrier or even anchor carrier. The remaining ones are called Secondary Component Carriers (SCCs) or simply secondary carriers or even supplementary carriers. The serving cell is interchangeably called a Primary Cell (PCell) or a Primary Serving Cell (PSC). Similarly the secondary serving cell is interchangeably called a Secondary Cell (SCell) or a Secondary Serving Cell (SSC).

While the following terms may be in general use in the art, they are particularly relevant to the embodiments and are therefore elaborated here.

An LTE downlink physical signal ('physical signal' as used herein) corresponds to a set of resource elements used by the physical layer but does not carry information originating from higher layers. Two downlink physical signals are defined: reference signals and synchronization signals.

An LTE downlink physical channel ('physical channel' as used herein) corresponds to a set of resource elements carrying information originating from higher layers (see, for example, 3GPP Technical Specification (TS) 36.211 V12.0.0, section 6.1.1). LTE physical channels include the Physical Downlink Shared Channel (PDSCH), the Physical Broadcast Channel (PBCH), the Physical Multicast Channel (PMCH), the Physical Control Format Indicator Channel (PCFICH), the Physical Downlink Control Channel (PDCCH), the Physical Hybrid Automatic Repeat Request Indicator Channel (PHICH), and the Enhanced Physical Downlink Control Channel (ePDCCH).

An LTE antenna port is defined such that the radio propagation channel over which a symbol on the antenna port is conveyed can be inferred from the radio propagation channel over which another symbol on the same antenna port is conveyed.

Two antenna ports are said to be quasi co-located if the large-scale properties of the radio propagation channel over which a symbol on one antenna port is conveyed can be inferred from the radio propagation channel over which a symbol on the other antenna port is conveyed. The large-scale properties include one or more of delay spread, Doppler spread, Doppler shift, average gain, and average delay.

Reference signals are physical signals that are transmitted on the same antenna port as a physical channel and can be used to estimate the radio propagation channel for the physical channel.

In the context of LTE, spatial multiplexing may be defined as a mode of transmission of a physical channel in which independent information bearing symbols can be transmitted in the same resource elements but using distinct antenna ports, or equivalently, multiple codewords can be transmitted on different layers of the physical channel.

Spatial multiplexing can be contrasted with spatial diversity, which can be defined as a mode of transmission of a physical channel in which distinct antenna ports are also used, but if the information bearing symbols occupy the same resource, they are interdependent (through, e.g., space-time coding) or information bearing symbols occupy distinct resource elements in order to avoid interference (as in frequency selection transmit diversity). Equivalently, spatial diversity may be defined as transmitting a single codeword on multiple layers.

As described below, the present disclosure relates to transmitting and receiving assistance information to assist a UE in suppressing or cancelling an interfering physical channel using Network Assisted Interference Cancellation and Suppression (NAICS) functionality. In particular, the assistance information assists the UE with blind detection of one or more transmission parameters (e.g., rank and/or precoding matrix) used for transmission of the interfering physical channel by, e.g., indicating rank and/or precoding matrix restrictions for the interfering physical channel.

Before describing embodiments of the present disclosure, a discussion of problems with existing solutions is beneficial. LTE supports a codebook subset restriction mechanism that limits the precoding matrices and rank of PDSCHs transmitted to a UE by its serving cell. This mechanism can be used to restrict the UE to report precoding matrices and ranks that are best suited to the eNB's antenna configuration and/or to the channel conditions. However, it does not provide information about the codebook subsets used to transmit PDSCHs on interfering cells, and so this existing mechanism cannot be used to improve complexity or reliability of inter-cell interference cancellation or suppression in NAICS UEs.

Instead of blindly detecting interfering PDSCH precoding matrices and rank, the UE could determine this information by decoding the PDCCH of an interfering cell. However, this requires the interfering cell to transmit PDCCHs to its served UEs such that NAICS UEs in neighboring cells can decode the PDCCHs, which may require extra resources (higher PDCCH aggregation levels or more transmit power). Furthermore, the effort to decode one or multiple neighboring PDCCHs on one or more interfering cell may significantly increase a NAICS UE's complexity or the power it needs in NAICS operation.

LTE supports assistance signaling for UEs capable of Common Reference Signal (CRS) Interference Cancellation (CRS-IC) in the context of a Further Enhanced Inter-Cell Interference Coordination (FeICIC) feature. This assistance signaling (provided using the Radio Resource Control (RRC) information element NeighCellsCRS-Info-r12) provides the physical cell Identifier (ID), number of CRS antenna ports, and Multicast-Broadcast Single-Frequency Network (MBSFN) subframe configuration for one or more neighboring cells. This information can assist a UE to cancel LTE physical signals such as CRSs, but is insufficient assistance for NAICS UEs that cancel LTE physical channels with rapidly varying information content such as a PDSCH with varying spatial multiplexing rank or PDSCH transmitted using a precoding derived from Channel State Information (CSI) feedback.

Embodiments of the present disclosure relate to providing assistance signaling to UEs with advanced receivers that indicates a neighboring cell can be assumed to be using a given number of spatially multiplexed layers or a subset of precoding matrices. Using this assistance information, the UEs can blindly detect parameters related to the transmission of one or more interfering PDSCH(s) in a less complex manner (e.g., by searching a reduced number of ranks and Precoding Matrix Indicators (PMIs)) and then suppress or cancel the interfering PDSCH(s) using the NAICS functionality of the advanced receiver. This disclosure provides aspects such as:

An identity of an interfering PDSCH is explicitly tied to a set of transmission modes that the UE may assume are used for the PDSCH. This knowledge reduces the effort to blindly detect the interfering PDSCH.
  The UE may assume that spatial multiplexing with certain ranks is not used on interfering PDSCHs. This applies to Transmission Modes (TMs) that do not use PMI feedback (e.g., TM 3) as well as ones with PMI feedback (TMs 4, 5, 8, 9, and 10).
  Precoding matrices in the four CRS port codebook that require the $\sqrt{2}/2$ scaling factor may be excluded to reduce UE blind detection complexity.
  The maximum number of precoding matrices that the network can signal to the UE is less than the full codebook size. The maximum number is known a priori by both the eNB and the UE, as this allows lower complexity blind detection.

In a signaled subset of multiple ranks, the PMIs in rank n+1 are a subset of PMIs in rank n.

Precoding matrix subsets are only signaled for interferers using transmission modes with four CRS ports and PMI feedback (i.e., TMs 4, 5, and 6). Precoding matrix subset restrictions are not needed for Demodulation Reference Signal (DMRS) based TMs (8, 9, and 10).

The use of four CRS port transmit diversity is not restricted on interfering PDSCHs (through the assistance signaling).

Assistance signaling is not provided for TMs 4, 5, and 6 with two CRS ports.

In alternative embodiments assuming tightly synchronized transmitters, the interfering PDSCHs for which assistance is provided are assumed to be quasi-collocated at least with respect to Doppler shift and Doppler spread with the serving PDSCH.

According to some embodiments, a list of assistance information is provided, where each element of the list corresponds to one or more interfering PDSCHs, each PDSCH may be identified by a scrambling ID or a physical cell ID that may be used to generate the PDSCH, the interfering PDSCHs in the list are assumed to be quasi-collocated at least with respect to Doppler shift and Doppler spread with each other and with the serving PDSCH, and each element of the list constrains at least the number of spatially multiplexed layers on an interfering PDSCH.

As a result of the features described herein, UE complexity is reduced and blind detection reliability is increased. The rank of the precoding matrices used to transmit interference is restricted (preferably to rank 2, according to an example). This reduces the effort to search for the interfering precoding matrices by at least a factor of 2. The number of precoding matrices the UE must blindly detect for each rank is reduced. A given precoding matrix is used for all valid interferer ranks, which further reduces the number of precoding matrices the UE must search for over all ranks. Moreover, the subsets can be adapted to match eNB antenna configurations or radio channel conditions, and so performance loss from subset restriction is limited.

Before describing embodiments of the present disclosure, a discussion of PMI and rank blind detection with codebook subset restriction and the complexity of this blind detection is beneficial. Algorithms to blindly detect the rank and precoding matrix used on an interfering PDSCH will now be presented. For exemplary purposes, the LTE two and four CRS antenna port codebooks in 3GPP TS 36.211 v12.0.0 section 6.3.4.2.3, Tables 6.3.4.2.3-1 and 6.3.4.2.3-2, respectively are assumed for the purpose of complexity analysis. Similar codebooks could instead be used in embodiments described herein, without departing from the scope of the present disclosure.

A distance metric can be used to compare the covariance of data bearing resource elements in a UE's received signal to hypothetical covariance matrices generated from channel estimates and hypotheses of rank and/or precoding used on the PDSCH. The blindly detected rank and/or precoding matrix correspond to the hypothesis with the minimum distance metric.

The received signal on two UE antennas from four eNB transmit antennas may be modelled as:

r=HWs where:

H is a 2×4 matrix of channel responses per subcarrier, with the rows corresponding to UE receive antennas and the columns corresponding to eNB transmit antennas;

W is a 4×2 precoding matrix, with the rows corresponding to eNB transmit antennas and the columns corresponding to the number of spatially multiplexed layers;

s is a 2×M matrix of modulation symbols, with the rows corresponding to layers and the columns corresponding to subcarriers and/or Orthogonal Frequency Division Multiplexing (OFDM) symbols; and r is a 2×M matrix of received symbols, with the rows corresponding to UE receive antennas and the columns corresponding to subcarriers and/or OFDM symbols, and where each symbol has unity power.

According to one example, elements of H are constant across M subcarriers and/or OFDM symbols. That is, the channel is sufficiently flat in frequency and time to be represented with a complex constant per transmit-receive antenna pair.

In order to blindly estimate PMI and rank, one can compare the covariance of the received signal to what one may expect from the estimated channel given the different PMI and rank hypotheses.

If one makes the approximation that the symbols on the layers are orthogonal, then the received covariance can be estimated using the estimated channel $\hat{H}$ and each hypothesized precoding matrix $\hat{W}$.

$$\hat{R} = \hat{H}\hat{W}ss^H \hat{W}^H \hat{H}^H \approx M\hat{H}\hat{W}\begin{bmatrix} 1 & 0 \\ 0 & x \end{bmatrix}\hat{W}^H \hat{H}^H$$

where:

$$x = \begin{cases} 0 & \text{if rank} = 1 \\ 1 & \text{if rank} = 2 \end{cases}$$

If one splits the hypothesized precoding matrix $\hat{W}$ into vectors $\hat{w}_1$ and $\hat{w}_2$ corresponding to the first and second layers, respectively, and drops the scale factor of M, the approximation becomes:

$$\hat{R} = \hat{H}\hat{w}_1 \hat{w}_1^H \hat{H} + x\hat{H}\hat{w}_2 \hat{w}_2^H \hat{H}$$

One can then compare the covariance calculated from the received symbols (i.e., R=rr$^H$) to the estimated covariance for each PMI and rank hypothesis using the distance metric:

$$p_e = \|R - \hat{R}\|$$

where:

∥ ∥ is some suitable matrix norm, such as the Frobenius norm squared.

Given the formulation above, one can make some observations on the computational complexity of PMI and rank detection:

1. Calculating $\hat{H}\hat{w}$ can be relatively simple since the LTE precoding codebooks can be implemented using only complex addition and a small number of $\sqrt{2}/2$ scalings. To compute $\hat{H}\hat{w}$ for all 16 PMI vectors in a given rank requires at most 16 PMIs*3 complex additions per PMI vector*2 complex additions/real addition*2 receive antennas=192 real additions and 8 scalings by factor $\sqrt{2}/2$. The number of complex additions can be further reduced by exploiting the structure of the codebook. Also, note that a $\sqrt{2}/2$ scaling is simpler than an arbitrary multiplication by a complex number. If one compares to complex multiplications, and assumes that 8 bit fixed point complex multiplication can be used, each complex multiplication requires roughly 8*4=32 real additions. Further assuming that a $\sqrt{2}/2$ scaling of a complex number is ¼ as complex as a full complex multiplication, then the effort to compute $\hat{H}\hat{w}$ for all 16 PMI vectors for a given rank is equivalent to about 192/32+8/4=8 complex multiplications.

2. Computing $\hat{R}=\hat{H}\hat{w}\hat{w}^H\hat{H}^H$ from the composite estimated channel $\hat{G}=\hat{H}\hat{w}$ takes 8 real+2 complex multiplications=4 complex multiplications. Computing this over all 16 PMI vectors then leads to (8 real multiplications/4 real multiplications per complex multiplication+2 complex multiplications)*16 PMIs=64 complex multiplications. Therefore, computing the estimated covariance matrix $\hat{R}$ is significantly more complex than applying the codebook to find the composite channel hypotheses (at least eight times more complex). In other words, the number of PMI hypotheses rather than the number of transmit antennas drives complexity.

3. For the two CRS codebook, two complex additions are needed to compute $\hat{G}$ for PMI vectors in a given rank, and so is negligible. Since computing the estimated covariance takes the same number of multiplications per PMI as for the four CRS case above, the number of complex multiplications is 4*4=16 and 4*2=8 complex multiplications for ranks 1 and 2, respectively.

4. The nested structure of the LTE precoding codebook allows us to compute at most 2*16=32 hypotheses to jointly determine rank and PMI for four CRS ports. That is, for a given rank 1 PMI vector $\hat{w}_1$, there is only one rank 2 PMI vector $\hat{w}_2$. So, once one finds a rank 1 covariance estimate, there is only one corresponding rank 2 covariance estimate, and that is formed by adding the term corresponding to the second PMI vector:

$$\hat{R}_2=\hat{R}_1+\hat{H}\hat{w}_2\hat{w}_2^H\hat{H}^H=\hat{H}\hat{w}_1\hat{w}_1^H\hat{H}^H+\hat{H}\hat{w}_2\hat{w}_2^H\hat{H}^H$$

5. Computing the covariance of the received symbols requires 3*M complex multiplications (if the Hermitian structure of R is exploited). In order for the approximation to hold, M must be large enough for the layers to de-correlate. So, a minimum value is on the order of M=10 and a more reasonable value could be roughly M=100 (if one considers that PMI blind detection is currently done on a Physical Resource Block (PRB)-pair basis which leads to a number of resource elements over which R can be computed which is in the order of 100). Therefore about 3*10=30 to 3*100=300 complex multiplications could be needed to compute R.

Taking 1-3 above into account, one can conclude that computing all PMI and rank indicator hypotheses should take at most about 2*(8+64)=144 complex multiplications for rank 2 interference or 4*(8+64)=288 complex multiplications for rank 4 interference, whereas computing the received covariance R takes in the range of 30-300 complex multiplications. (If wider bit widths are needed for complex multiplication then computing R will cost proportionally more).

The overall amount of computation for two and four CRS ports is compared in the table below.

TABLE 1

| CRS Ports | R | $\hat{R}$ | Total | Complexity Ratio |
|---|---|---|---|---|
| 2 | 30-300 | 24 | 54-324 | 1 |
| 4 (rank 4) | 30-300 | 288 | 318-588 | 5.9-1.8 |
| 4 (rank 2) | 30-300 | 144 | 174-444 | 3.2-1.4 |

From Table 1, one can find that if a small number of subcarriers are used for blind detection, four CRS ports can be on the order of 3.2 times or 5.9 times more computationally expensive than two CRS ports for rank 2 or 4 interference, respectively. However, if a conservative number of subcarriers is used in the blind detection, four CRS ports take about 1.4 times or 1.8 times more computation than two CRS ports. Given that at least a PRB pair seems to be required for blind detection accuracy, the number of subcarriers needed is probably on the higher end, according to one example. Also, it may be reasonable to assume that, in LTE Release 12 networks, there is not a large amount of rank 3 or 4 interference. Given these assumptions on the required number of subcarriers and on interference rank, one can conclude that the amount of computation needed for four CRS ports is not much greater than that required for two CRS ports at least for rank up to 2. However, it should be noted that the rank restriction can have some useful benefits for blind detection complexity even for a conservative required number of subcarriers.

Some cost savings are possible if channel covariance matrices are used to directly compute the estimated covariance matrix $\hat{R}$ instead of using the composite estimated channel $\hat{G}$. The expression for the composite estimated channel $\hat{G}$ can be rewritten as:

$$\hat{G} = \begin{bmatrix} \hat{h}_1\hat{w}_1 & x\hat{h}_1\hat{w}_2 \\ \hat{h}_2\hat{w}_1 & x\hat{h}_2\hat{w}_2 \end{bmatrix}, \text{ where } \begin{bmatrix} \hat{h}_1 \\ \hat{h}_2 \end{bmatrix} = H \text{ and } [\hat{w}_1 \ \hat{w}_2] = \hat{W}$$

Then $$\hat{R} = \hat{G}\hat{G}^H = \begin{bmatrix} \hat{w}_1^H\hat{h}_1^H\hat{h}_1\hat{w}_1 + x\hat{w}_2^H\hat{h}_1^H\hat{h}_1\hat{w}_2 & \hat{w}_1^H\hat{h}_2^H\hat{h}_1\hat{w}_1 + x\hat{w}_2^H\hat{h}_2^H\hat{h}_1\hat{w}_2 \\ \hat{w}_1^H\hat{h}_1^H\hat{h}_2\hat{w}_1 + x\hat{w}_2^H\hat{h}_1^H\hat{h}_2\hat{w}_2 & \hat{w}_1^H\hat{h}_2^H\hat{h}_2\hat{w}_1 + x\hat{w}_2^H\hat{h}_2^H\hat{h}_2\hat{w}_2 \end{bmatrix} =$$

$$\begin{bmatrix} \hat{g}_{11}^*\hat{g}_{11} + x\hat{g}_{12}^*\hat{g}_{12} & \hat{g}_{21}^*\hat{g}_{11} + x\hat{g}_{22}^*\hat{g}_{12} \\ \hat{g}_{11}^*\hat{g}_{21} + x\hat{g}_{12}^*\hat{g}_{22} & \hat{g}_{21}^*\hat{g}_{21} + x\hat{g}_{22}^*\hat{g}_{22} \end{bmatrix}$$

For the four CRS codebook, again noting that 4 of the 16 PMIs require a $\sqrt{2}/2$ scaling, then calculating $\hat{g}=\hat{h}_i\hat{w}_j$ requires 3*16 complex additions and 3*4 scalings, or equivalently 2*3*16/32+3*4/4=6 complex multiplications. Since there are 4 unique values of $\hat{g}_{ij}$ for both ranks and all PMIs and since $\hat{R}$ is Hermitian such that the two diagonal elements require four total real multiplications, and the off-diagonal element requires one complex multiplication, a total of 4*6+(4/4+1)*16*2=88 complex multiplications is needed for both ranks.

The method above that uses blind precoding matrix detection can be slightly modified to support rank detection of interfering PDSCHs that use DMRS for channel estimation (i.e., for rank detection of DMRS based transmission modes). When PDSCH uses DMRS for channel estimation, the composite estimated channel $\hat{G}$ can be formed directly from the channel estimates derived from DMRS (and without hypothesizing a precoding matrix $\hat{W}$). The two hypotheses for rank 1 and rank 2 for the estimated covariance matrix $\hat{R}$ can then be formed directly using the equation above, and the distance metric $P_e=\|R-\hat{R}\|$ can be evaluated to determine the rank as in the general method described above.

The following provides the downlink throughput of NAICS when codebook subset restriction is applied. Two types of NAICS receivers are considered: the enhanced linear minimum mean square Error Interference Rejection Combining (E-IRC) receiver and the Symbol Level Interference Cancellation (SLIC) receiver. To evaluate the performance with codebook subset restrictions, system level simulations were performed in the downlink with the assumptions of transmission mode 4 and four CRS antenna ports. The remaining simulation conditions may be summarized as follows:

Scenario 1 with simulation assumptions in accordance with 3GPP Technical Report (TR) 36.866 V1.1.0 with four transmit/2 receive (cross-polarized, ½ wavelength spacing)

The link to system modeling for SLIC receiver from Section 9.1.5.3 in 3GPP TR 36.866 V1.1.0 (i.e., Alternative 3)

Link adaptation based on CSI feedback (Mode 3-1, 5 milliseconds (ms)), adjusted with Outer Loop Link Adaptation (OLLA), CSI calculated prior to cancellation Proportional fair Time Division Multiplexing (TDM) scheduling and File Transfer Protocol (FTP) file packets of 0.1 megabyte (Mbyte)

A single interferer is cancelled

Genie aided knowledge of interferer parameters (i.e., no blind detection is considered here for simplicity)

The four CRS antenna port codebooks from Table 6.3.4.2.3-2 of 3GPP TS 36.211 V12.0.0 with a maximum rank of 2 are assumed.

Figure 3:
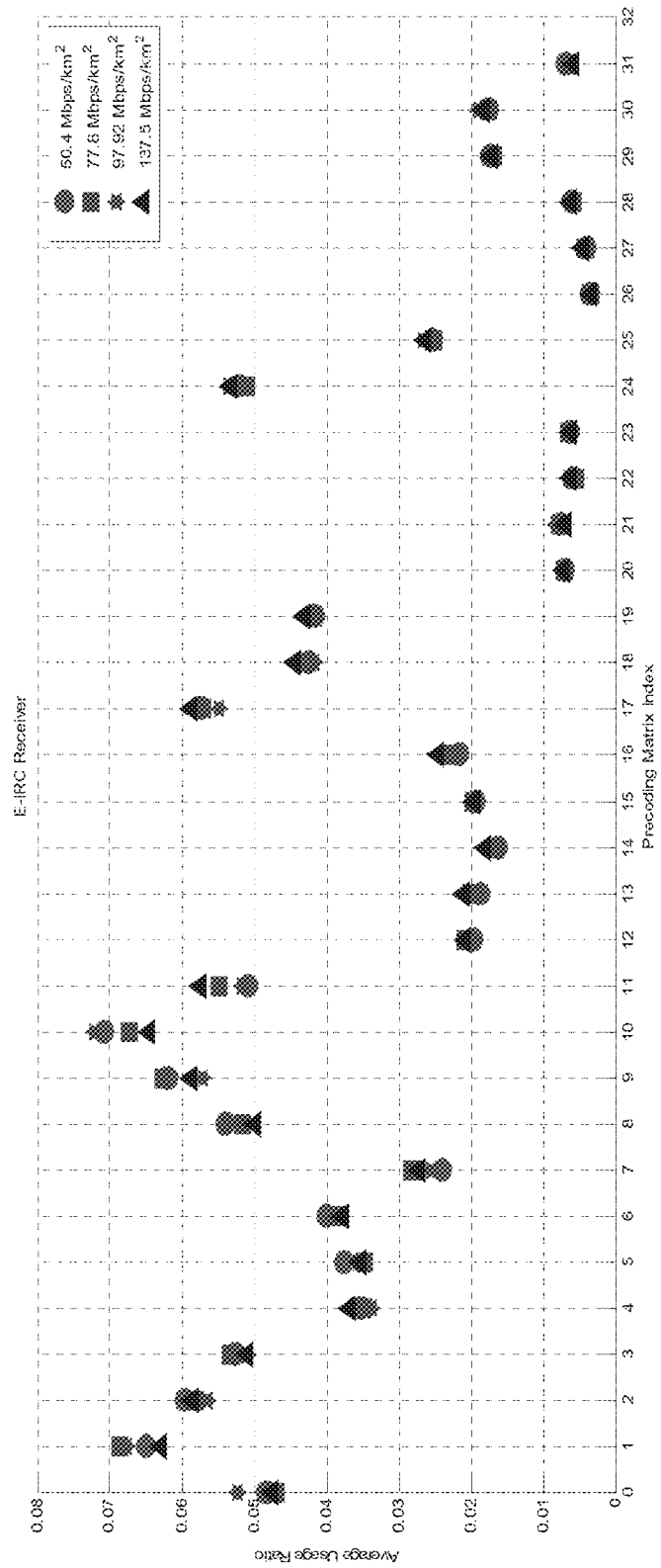
FIG. 3 illustrates simulation results for average Precoding Matrix Indicator (PMI) usage ratios for an Error Interference Rejection Combining (E-IRC) receiver with no codebook subset restriction.
Figure 4:
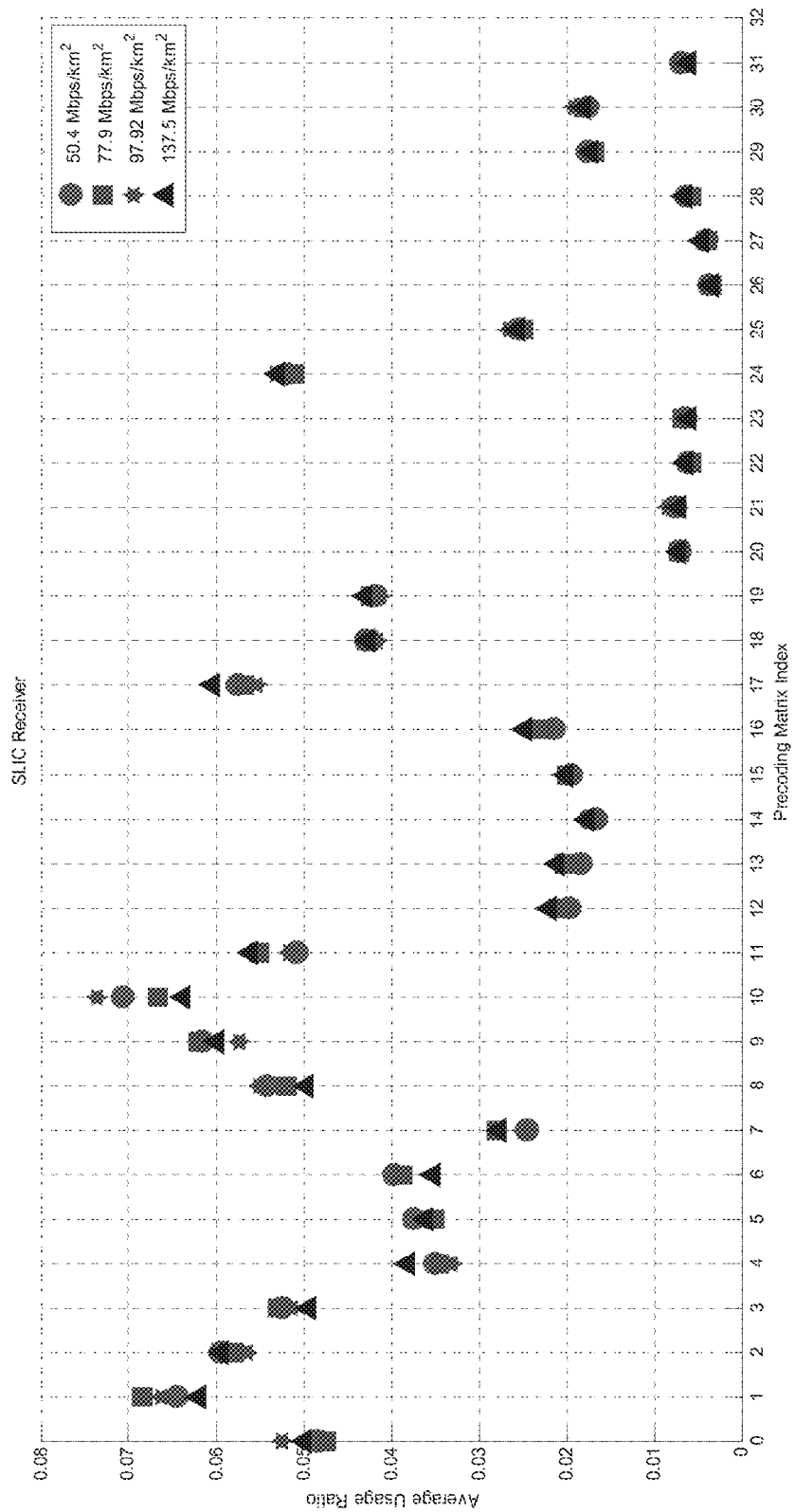
FIG. 4 illustrates simulation results for average PMI usage ratios for a Symbol Level Interference Cancellation (SLIC) receiver with no codebook subset restriction.

In order to understand how frequently each PMI is utilized for the above simulation settings, one can collect the PMI statistics for both E-IRC and SLIC receivers under a network with no codebook subset restrictions. Average PMI usage ratios for E-IRC and SLIC receivers are given in FIG. 3 (average PMI usage ratios for an E-IRC receiver with no codebook subset restriction) and FIG. 4 (average PMI usage ratios for a SLIC receiver with no codebook subset restrictions), respectively. Note that in these figures, PMIs 0-15 correspond to rank 1 and PMIs 16-31 correspond to rank 2. The average PMI ratios are plotted for four different served traffic values (which in turn are given in units of megabits per second per square kilometer (Mbps/km2)). In the remaining subsections, one can evaluate the performance impacts of codebook subset restrictions on rank 1 PMIs and rank 2 PMIs.

To evaluate the performance impact of subset restriction on rank1 PMIs, one can choose three different subset restriction cases as shown in Table 2. These subset restriction cases were derived based on the average usage ratio results from FIG. 3 and FIG. 4 (where a given number of PMIs with the highest usage ratios are chosen for both ranks 1 and 2). It should be noted that the same four PMIs are chosen in cases 1-3 of Table 2 in order to evaluate the performance impact of varying restriction sizes of rank 1 PMIs.

TABLE 2

Subset Restriction Cases for Impact Study on Rank 1 PMIs

| Subset Restriction Case Number | Total Number of PMIs for Ranks 1-2 | Rank 1 PMIs | Rank 2 PMIs |
|---|---|---|---|
| 1 | 16 | {0, 1, 2, 3, 4, 5, 6, 7, 8, 9, 10, 11} | {1, 2, 3, 8} |
| 2 | 12 | {0, 1, 2, 3, 8, 9, 10, 11} | {1, 2, 3, 8} |
| 3 | 8 | {1, 2, 9, 10} | {1, 2, 3, 8} |

Figure 5:
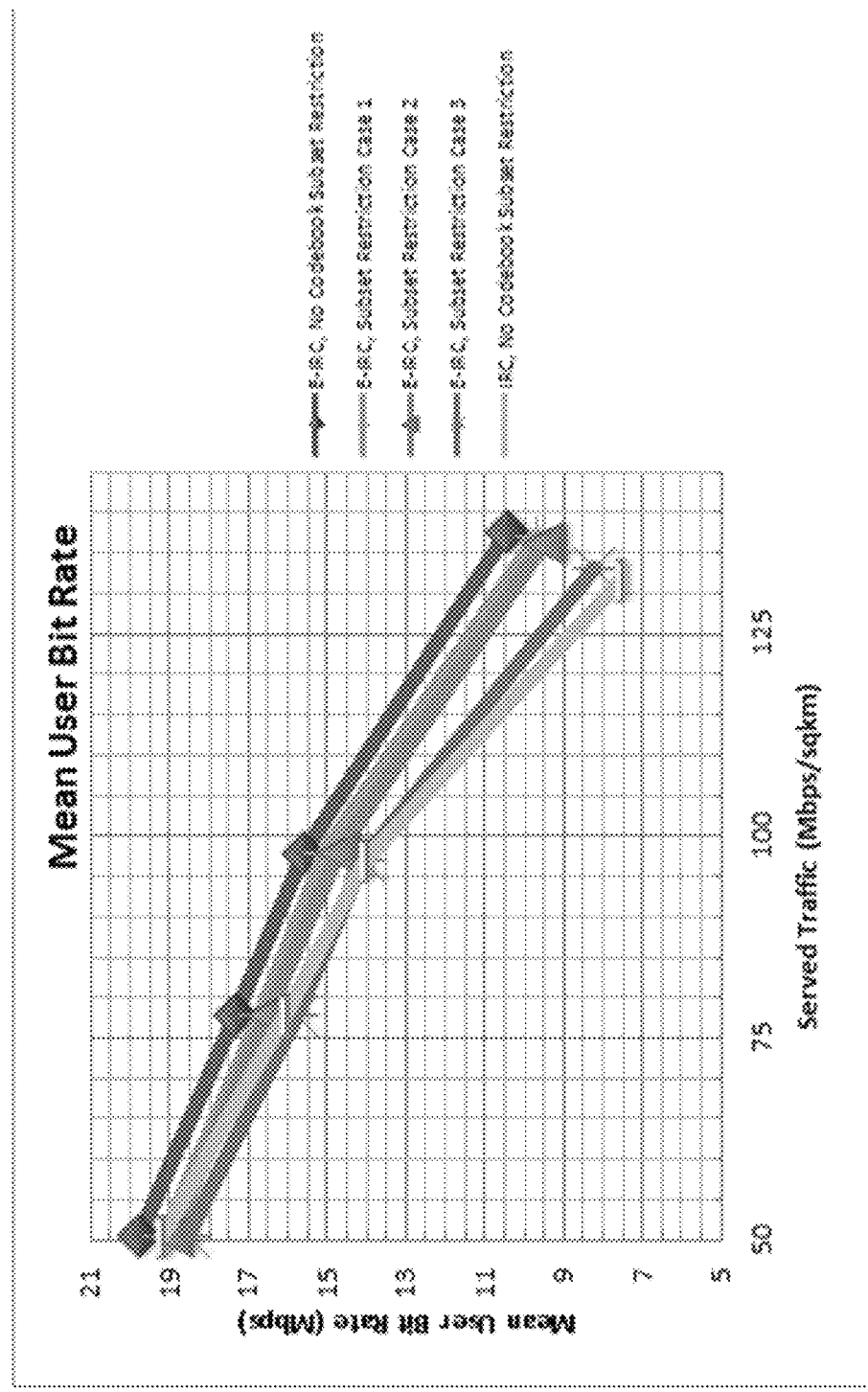
FIG. 5 illustrates simulation results for mean user bit rates for an E-IRC receiver with subset restriction.
Figure 6:
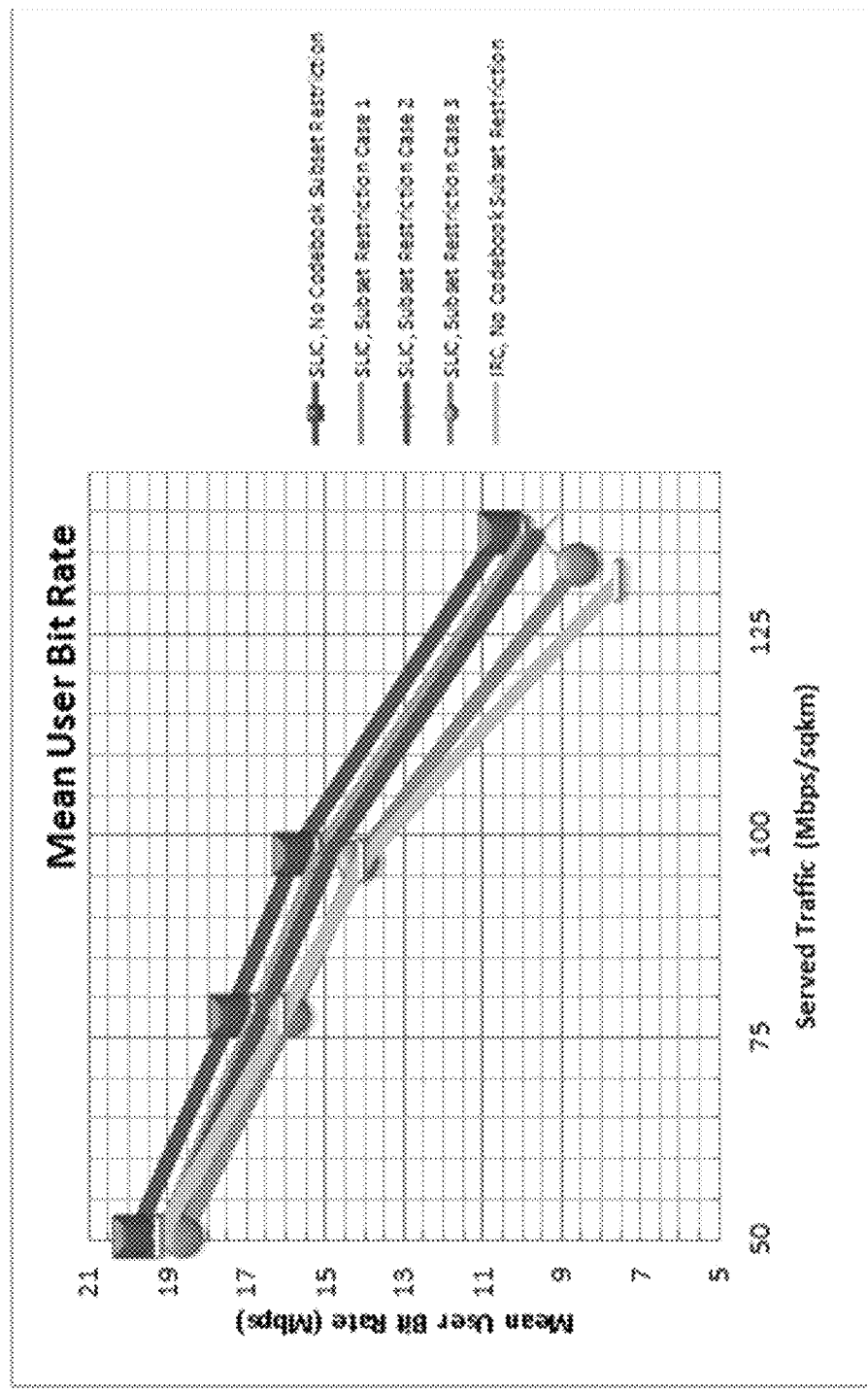
FIG. 6 illustrates simulation results for mean user bit rates for a SLIC receiver with subset restriction.

The mean user bit rates over varying served traffic values are shown in FIG. 5 (mean user bit rates for an E-IRC receiver with subset restriction cases 1-3) and FIG. 6 (mean user bit rates for a SLIC receiver with subset restriction cases 1-3) for E-IRC and SLIC receivers, respectively. Also shown in these figures is the performance of the baseline Interference Rejection Combining (IRC) receiver. The mean user rate gains achieved by the two NAICS receivers (with and without subset restriction) are summarized in Table 3. From Table 3, subset restriction case 2 seems to retain most of the performance gain achieved by the NAICS receivers without subset restriction. Even though subset restriction case 2 suffers slight performance losses at a low served traffic value of 50 Mbps/km2, this is not a concern since even the NAICS receivers without subset restriction do not offer much gain at such low served traffic values. Furthermore, subset restriction case 3 does not seem to retain much of the performance gain achieved by the NAICS receivers without subset restriction.

TABLE 3

Percentile mean user rate gains over baseline IRC for Subset Restriction Cases 1-3

| Served Traffic (Mbps/km$^2$) | E-IRC No Restriction | E-IRC Case 1 | E-IRC Case 2 | E-IRC Case 3 | SLIC No Restriction | SLIC Case 1 | SLIC Case 2 | SLIC Case 3 |
|---|---|---|---|---|---|---|---|---|
| 50 | 2.6% | 0.0% | −1.3% | −3.4% | 3.4% | 0.0% | −1.3% | −2.9% |
| 75 | 6.7% | 3.0% | 2.1% | −2.1% | 8.2% | 3.7% | 2.4% | −1.2% |
| 100 | 14.1% | 9.3% | 7.0% | 0.4% | 14.8% | 9.6% | 7.4% | 0.7% |
| 130 | 45.6% | 34.2% | 31.6% | 10.1% | 45.6% | 39.2% | 32.9% | 16.5% |

Figure 7:
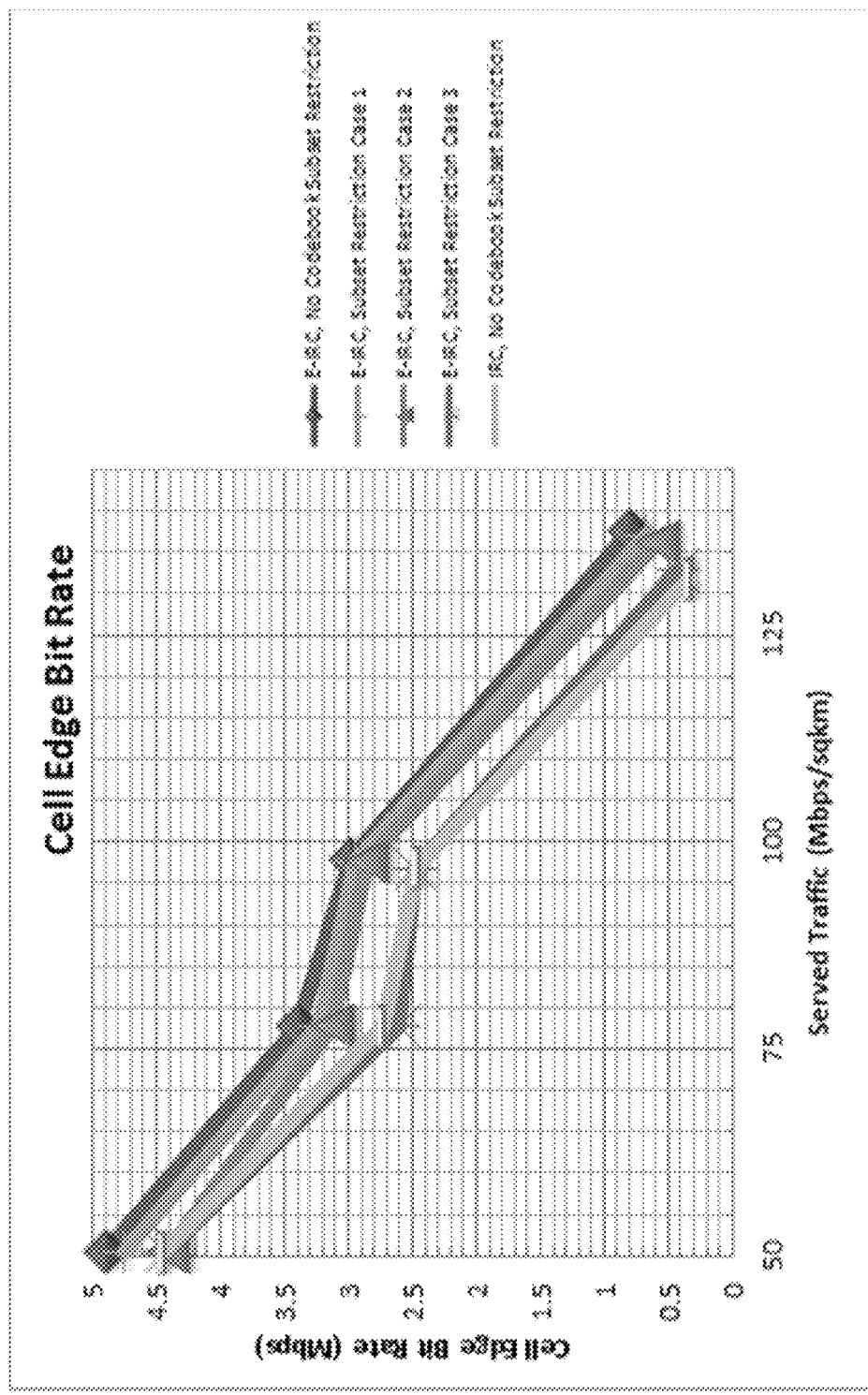
FIG. 7 illustrates simulation results for cell edge rates for an E-IRC receiver with subset restriction.
Figure 8:
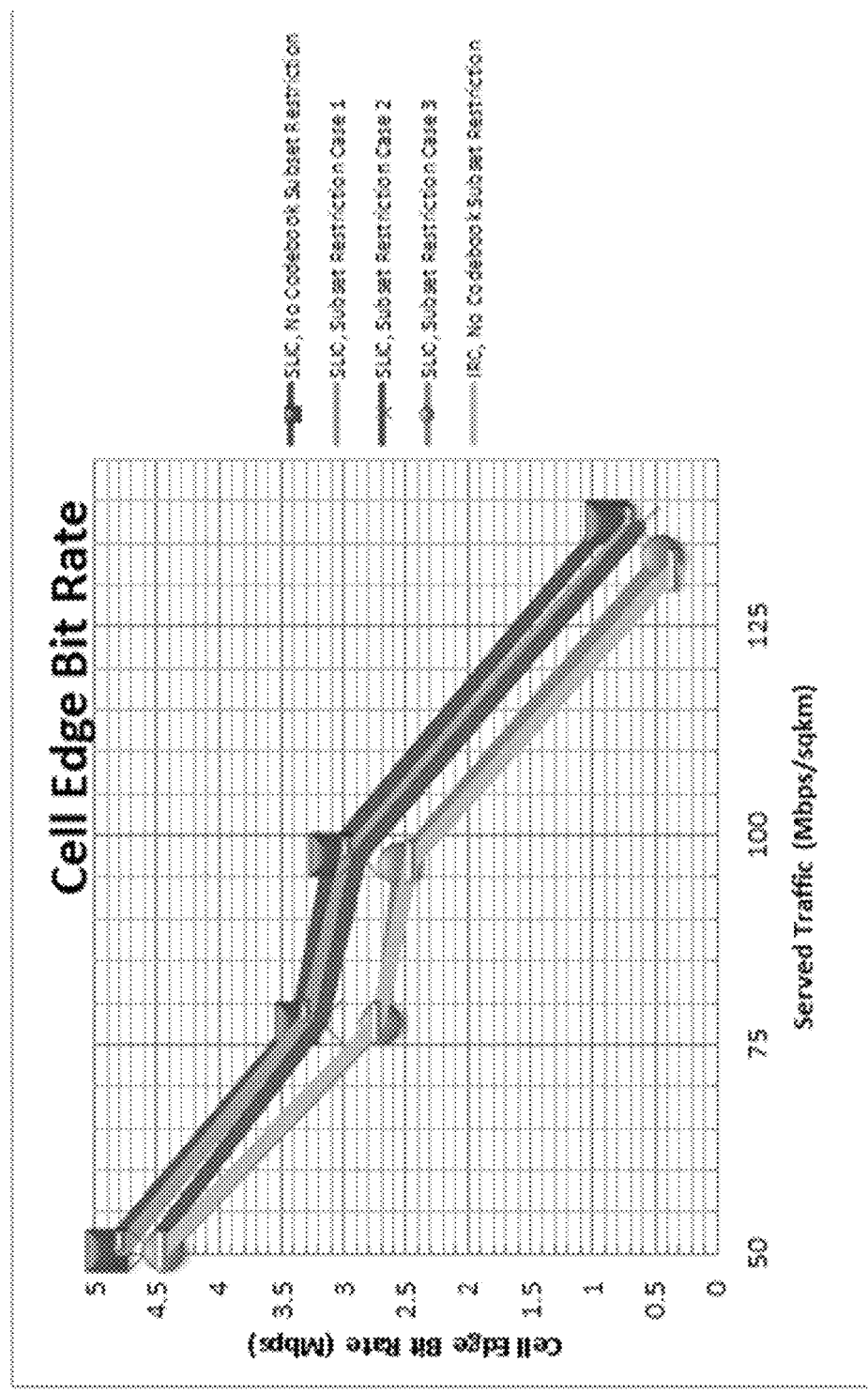
FIG. 8 illustrates simulation results for cell edge rates for a SLIC receiver with subset restriction.

The cell edge bit rates over varying served traffic values are shown in FIG. 7 (cell edge rates for an E-IRC receiver with subset restriction cases 1-3) and FIG. 8 (cell edge rates for a SLIC receiver with subset restriction cases 1-3) for E-IRC and SLIC receivers, respectively. The performance of the baseline IRC receiver is also shown in FIGS. 7 and 8 for comparison. Cell edge rate gains achieved by the two NAICS receivers (with and without subset restriction) are summarized in Table 4. Case 2 once again seems to retain most of the performance achieved by the NAICS receivers without subset restriction (particularly at medium to high served traffic values). On the other hand, subset restriction case 3 does not yield favorable performance when compared to that of the NAICS receivers without subset restriction.

Hence, from the performance results summarized in Table 3 and Table 4, one can conclude that a subset restriction size of 8 (i.e., the size corresponding to case 2) for rank 1 PMIs can give a reasonable performance-complexity tradeoff.

TABLE 4

Percentile cell edge rate gains over baseline IRC for Subset Restriction Cases 1-3

| Served Traffic (Mbps/km²) | E-IRC No Restriction | E-IRC Case 1 | E-IRC Case 2 | E-IRC Case 3 | SLIC No Restriction | SLIC Case 1 | SLIC Case 2 | SLIC Case 3 |
|---|---|---|---|---|---|---|---|---|
| 50 | 10.0% | 6.6% | −1.0% | −0.1% | 10.0% | 7.5% | 3.3% | −0.6% |
| 75 | 22.4% | 17.2% | 12.1% | −3.4% | 20.7% | 19.0% | 14.5% | −1.0% |
| 100 | 26.1% | 21.7% | 17.4% | 0.0% | 28.7% | 21.7% | 18.3% | 2.2% |
| 130 | 166.7% | 133.3% | 111.1% | 33.3% | 188.9% | 144.4% | 126.7% | 40.0% |

Next, to study the performance impact of subset restriction on rank 2 PMIs, one can choose subset restriction cases 4-6 shown in Table 5. These subset restriction cases were derived based on the average usage ratio results from FIG. 3 and FIG. 4 (where a given number of PMIs with the highest usage ratios are chosen for both ranks 1 and 2). In order to evaluate the performance impact of varying restriction sizes of rank 2 PMIs, the same 12 PMIs for rank 1 are chosen for cases 4-6.

TABLE 5

Subset Restriction Cases for Impact Study on Rank 2 PMIs

| Subset Restriction Case Number | Total Number of PMIs for Ranks 1-2 | Rank 1 PMIs | Rank 2 PMIs |
|---|---|---|---|
| 4 | 24 | {0, 1, 2, 3, 4, 5, 6, 7, 8, 9, 10, 11} | {0, 1, 2, 3, 4, 5, 7, 8, 9, 12, 13, 14} |
| 5 | 20 | {0, 1, 2, 3, 4, 5, 6, 7, 8, 9, 10, 11} | {0, 1, 2, 4, 7, 8, 12, 13} |
| 6 | 16 | {0, 1, 2, 3, 4, 5, 6, 7, 8, 9, 10, 11} | {1, 2, 3, 8} |

Figure 9:
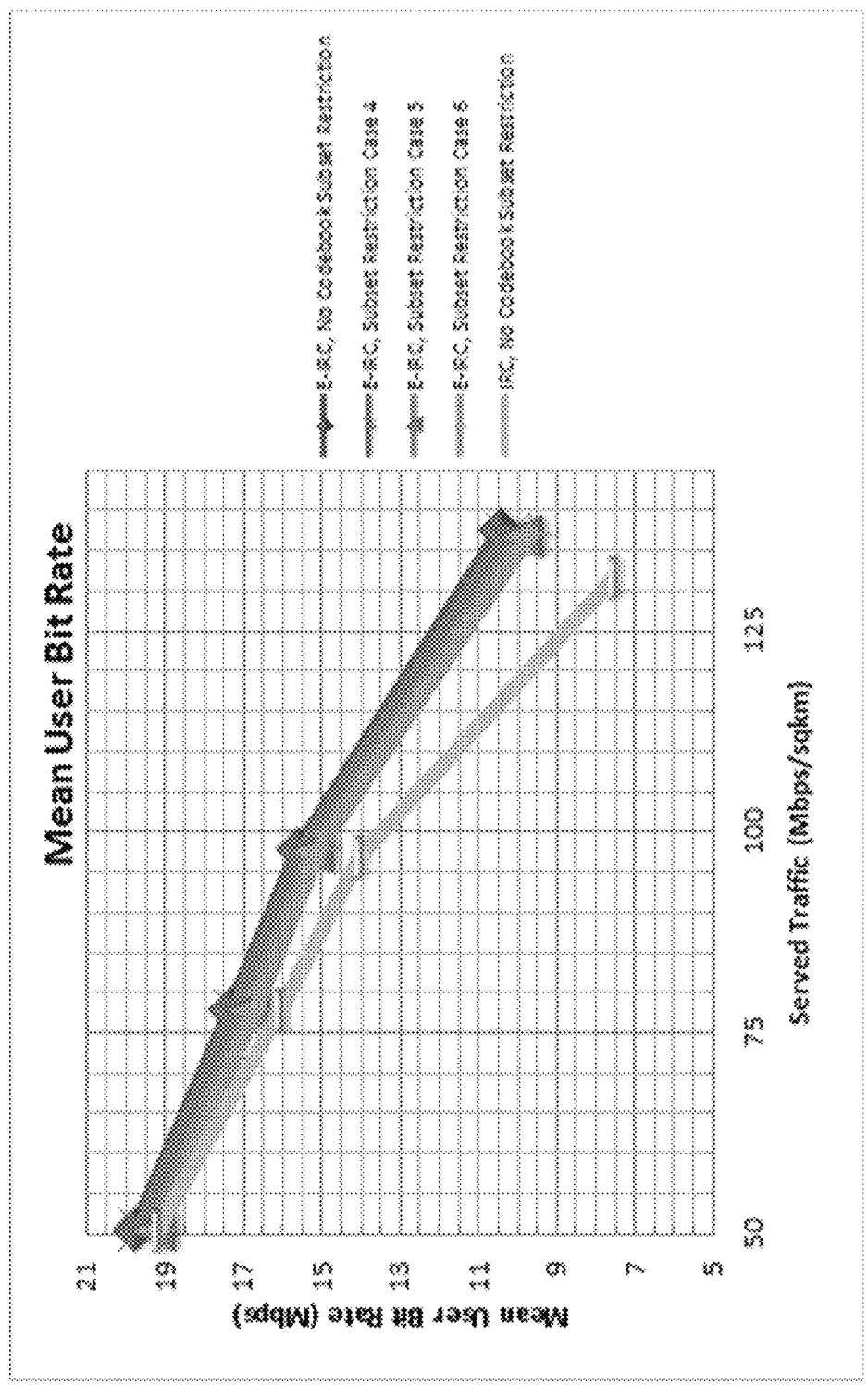
FIG. 9 illustrates simulation results for mean user bit rates over varying served traffic values for an E-IRC receiver.
Figure 10:
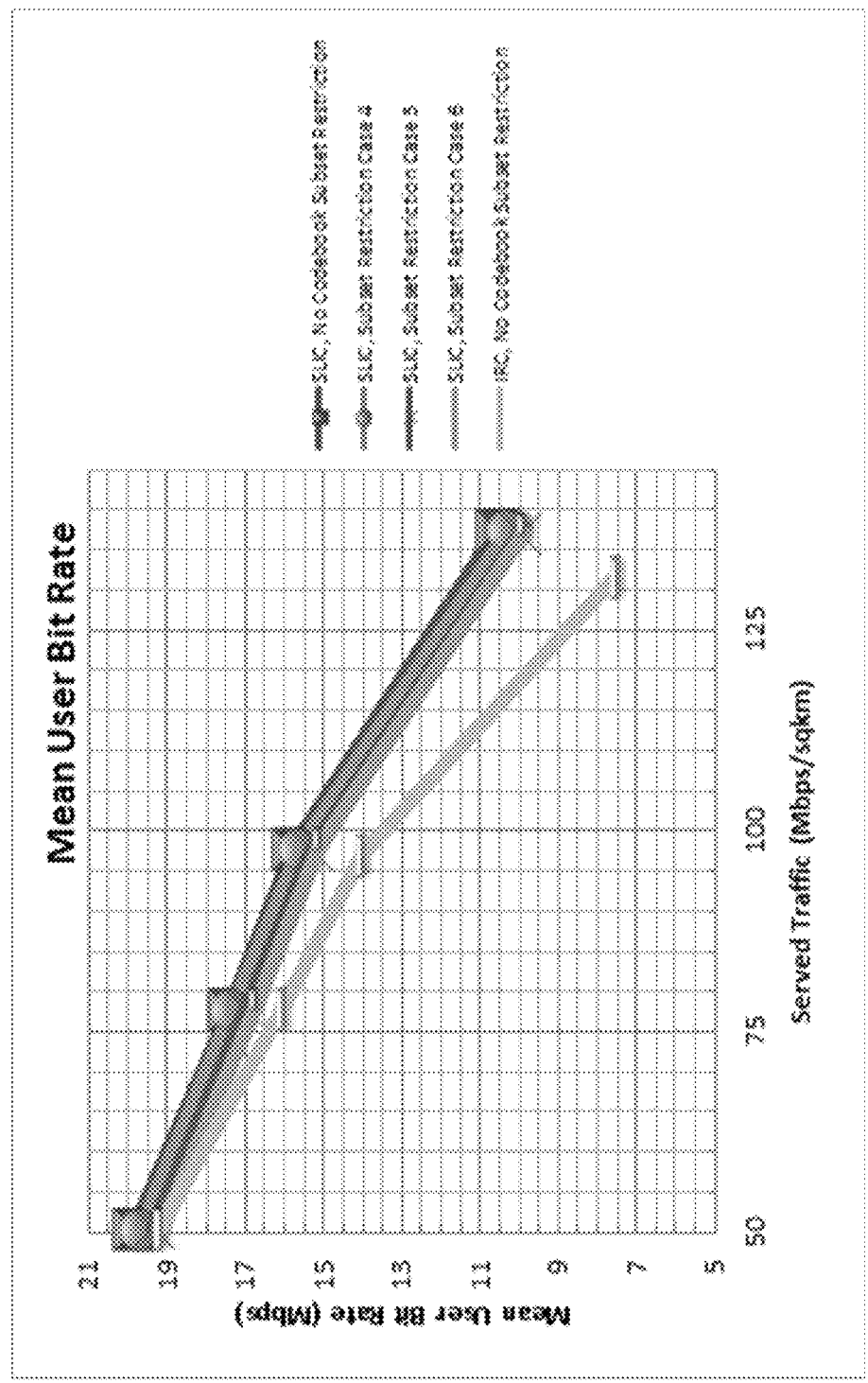
FIG. 10 illustrates simulation results for mean user bit rates over varying served traffic values for a SLIC receiver.

FIG. 9 and FIG. 10 show the mean user bit rates over varying served traffic values for E-IRC and SLIC receivers, respectively. Also shown in these figures is the performance of the baseline IRC receiver. The mean user rate gains achieved by the two NAICS receivers (with and without subset restriction) are summarized in Table 6. From Table 6, it is evident that subset restriction cases 4-6 all retain a major portion of the performance gain achieved by the NAICS receivers with no subset restriction.

TABLE 6

Percentile mean user rate gains over baseline IRC for Subset Restriction Cases 4-6

| Served Traffic (Mbps/km²) | E-IRC No Restriction | E-IRC Case 4 | E-IRC Case 5 | E-IRC Case 6 | SLIC No Restriction | SLIC Case 4 | SLIC Case 5 | SLIC Case 6 |
|---|---|---|---|---|---|---|---|---|
| 50 | 2.6% | 2.3% | 1.3% | 0.0% | 3.4% | 2.3% | 1.3% | 0.0% |
| 75 | 6.7% | 6.4% | 4.9% | 3.0% | 8.2% | 6.7% | 4.9% | 3.7% |
| 100 | 14.1% | 13.0% | 11.1% | 9.3% | 14.8% | 13.3% | 11.1% | 9.6% |
| 130 | 45.6% | 41.8% | 38.0% | 34.2% | 45.6% | 44.3% | 39.2% | 39.2% |

Figure 11:
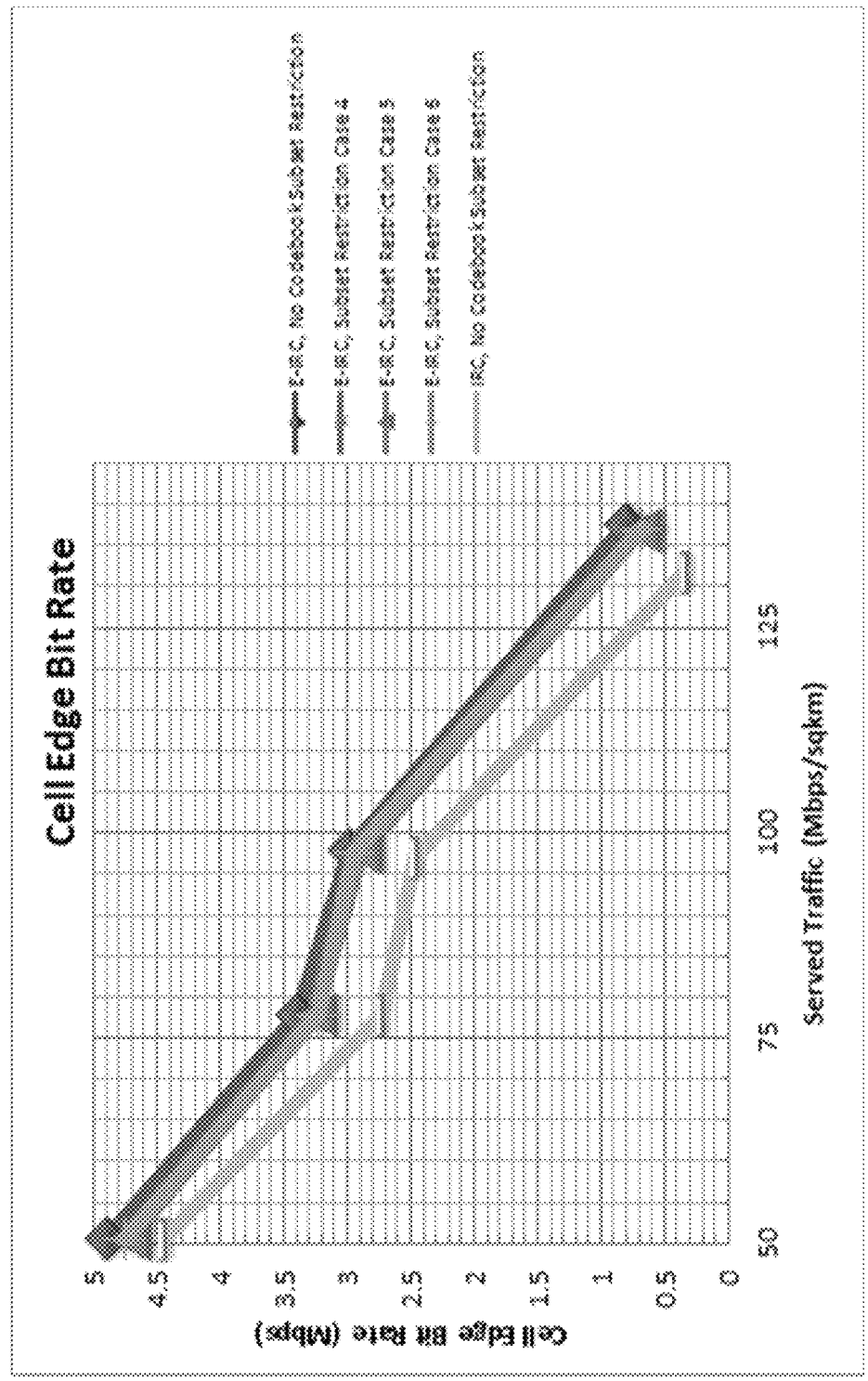
FIG. 11 illustrates simulation results for cell edge bit rates over varying served traffic values for an E-IRC receiver.
Figure 12:
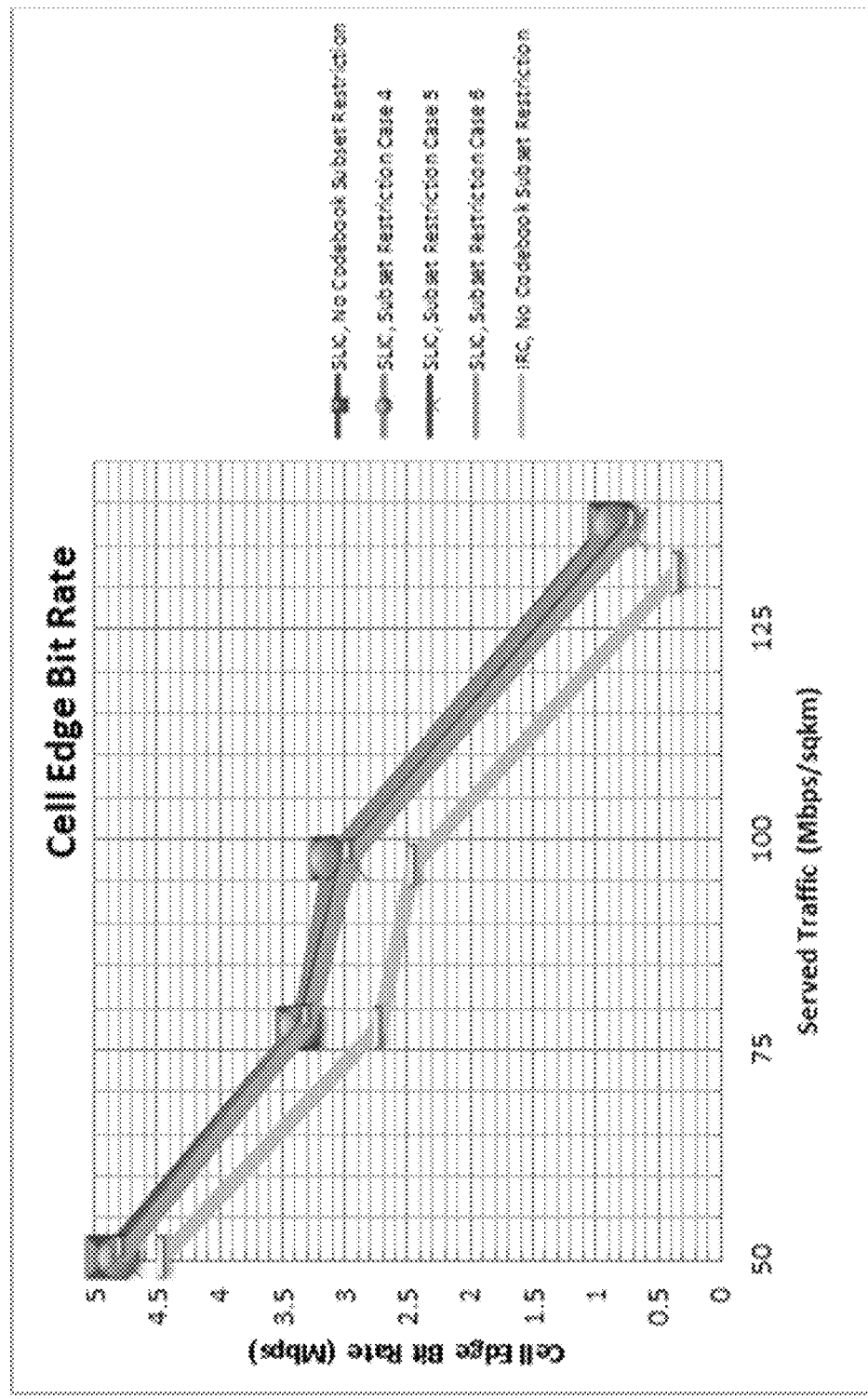
FIG. 12 illustrates simulation results for cell edge bit rates over varying served traffic values for a SLIC receiver.

The cell edge bit rates over varying served traffic values are shown in FIG. 11 and FIG. 12 for E-IRC and SLIC receivers, respectively. The performance of the baseline IRC receiver is also shown in FIGS. 11 and 12 for comparison. Cell edge rate gains achieved by the two NAICS receivers (with and without subset restriction) are summarized in Table 7. It is evident from this table that cases 4-6 all have comparable performance gain values with regards to the performance gains achieved by the NAICS receivers with no subset restriction.

Hence, from the performance results summarized in Table 6 and Table 7, one can conclude that a subset restriction size of 4 (i.e., the size corresponding to case 6) for rank 2 PMIs can give a reasonable performance-complexity tradeoff.

TABLE 7

Percentile cell edge rate gains over baseline IRC for Subset Restriction Cases 4-6

| Served Traffic (Mbps/km$^2$) | E-IRC No Restriction | E-IRC Case 4 | E-IRC Case 5 | E-IRC Case 6 | SLIC No Restriction | SLIC Case 4 | SLIC Case 5 | SLIC Case 6 |
|---|---|---|---|---|---|---|---|---|
| 50  | 10.0%  | 7.8%   | 6.1%   | 6.6%   | 10.0%  | 8.9%   | 8.0%   | 7.5%   |
| 75  | 22.4%  | 17.9%  | 17.2%  | 17.2%  | 20.7%  | 20.7%  | 19.7%  | 19.0%  |
| 100 | 26.1%  | 23.9%  | 19.6%  | 21.7%  | 28.7%  | 30.4%  | 23.9%  | 21.7%  |
| 130 | 166.7% | 144.4% | 144.4% | 133.3% | 188.9% | 177.8% | 155.6% | 144.4% |

Two factors may drive the design of codebook subset restrictions for NAICS: UE blind detection complexity or blind detection reliability. As discussed above, the main driver for complexity can be the total number of PMI and rank hypotheses. A secondary complexity driver could be the $\sqrt{2}/2$ scaling factor used in the LTE four CRS port codebook.

If blind detection reliability is the primary driving design factor, then the eNB can use the LTE Release 8 codebook subset selection mechanism to select a subset with improved distance properties (as a function of eNB antenna configuration). The same subsets as in LTE Release 8 could be indicated, and the determination of the subsets to signal to the UEs can be left to eNB implementation.

If UE blind detection complexity is a significant factor that drives the design, the number of elements in the codebook subset should be limited to some maximum value. Furthermore, this maximum codebook subset size should be known a priori to eNB and UE (e.g., fixed by specification) so that UE designs can exploit the smaller amount of blind detection needed with a smaller codebook subset. If the maximum size is not known to be strictly less than the full codebook size, then the maximum amount of computation needed in a subframe would not be reduced, and it would be difficult to reduce the amount of UE computational resources dedicated to blind detection. Restricting the rank is one way to limit the number of elements in a codebook subset. As discussed above, restricting the rank of the precoding matrices used by the interferer to, say, a rank of 2 can have significant benefit to blind detection complexity, reducing the effort to search for the interfering precoding matrices by at least a factor of 2. The blind detection performance of (both CRS based and DMRS based) PDSCHs with rank greater than 2 may also be questioned. Therefore, restricting interfering multi-codeword PDSCH transmissions to at most two layers can be used as a primary element of NAICS codebook subset restriction.

Complexity can be further reduced by restricting the precoding matrices used in each rank. In this case, the same precoding matrices should be used in each rank in order to obtain the maximum complexity benefit from the nested property of the codebook. If at most six precoding matrices are used over both ranks, then the complexity could be close to that of the two CRS codebook. However, a codebook this small will have degraded reliability, as shown in the simulation results provided above. Based on these results, one may not recommend a subset size of less than eight for rank 1 PMIs and four for rank 2 PMIs, according to some exemplary embodiments.

The complexity could be improved by eliminating the four precoding matrices with the scaling factor $\sqrt{2}/2$ (that is precoding matrices with PMIs 4, 5, 6, and 7 in Table 6.3.4.2.3-2 of 3GPP TS 36.211 V12.0.0). In such a case, the eNB would be restricted from using these precoding matrices. Since support for the LTE Release 8 codebook is likely to be well optimized in LTE UEs by now, it is doubtful that removing this scaling factor would improve complexity much in of itself. Therefore, if the four precoding matrices with the $\sqrt{2}/2$ scaling factor are to be removed, they would be removed in addition to other precoding matrices selected by eNB implementation until the size of the codebook was small enough to reach the target complexity.

It is noted that a codebook subset should in general be the same for all UEs served by a cell or transmission point, since it is driven by the transmitter's antenna configuration. This also means that a UE being interfered with by a transmitter can expect that transmitter to use the same subset when serving any of its UEs, and so a UE can use one subset restriction per interfering transmitter. Therefore, the subset restriction can be signaled per interfering transmitter and identified, e.g., based on one or more physical identity of the transmitter.

A UE should be able to select the best interferer(s) to suppress from a set of dominant interfering cells or transmission points. Therefore, multiple cells' or transmission points' subsets should be signaled. Since PDSCH and CRS may not be quasi-collocated in transmission mode 10, quasi-collocation information is needed for the UE to be able to frequency track transmission points. In tightly synchronized deployments, the differential frequency error between interfering and serving PDSCHs can be small; that is, they can be considered quasi-collocated. In such deployments, the UE can use a serving PDSCH to (at least partially) determine the frequency error of an interfering PDSCH, as well as to allow single Fast Fourier Transform (FFT) reception in NAICS UEs. So, in alternative embodiments targeting these tightly synchronized deployments the UE may assume that all PDSCHs are quasi-collocated with respect to Doppler shift and Doppler spread. Also, while the maximum number of dominant interfering PDSCHs may be different than the maximum number of cells with dominant CRS, one approach would be to use the maximum number of cells indicated by LTE Release 11 CRS-IC signaling as the maximum number of PDSCHs for which to provide NAICS assistance. Alternatively, a larger value for the maximum number of PDSCHs for which to provide NAICS assistance could be used for dense deployments where there can be more transmitters that interfere significantly with UEs.

Since four CRS port transmit diversity uses a pair of Space Frequency Block Coding (SFBC) transmissions mapped to independent subcarriers, receiving four CRS port transmit diversity on a given number of subcarriers has about the same complexity as receiving two CRS ports on that number of subcarriers. This structure also means that blind detection of the presence of TM 2 is about the same between two and four CRS ports in terms of both complexity and performance. Therefore, it should not be necessary to restrict the use of four CRS port transmit diversity on interfering cells.

It may be observed that four CRS port TM 3 may not be the most essential TM configuration for NAICS receivers to suppress, since it would normally be configured for a limited number of interfering UEs in good channel conditions but with insufficient channel information to allow channel tracking precoding to be used. This means that it should not be necessary to restrict the precoding matrices used on neighboring cells, although as noted above, restricting the rank to 2 may be beneficial.

UEs suppressing or cancelling DMRS based transmissions need not blind detect the precoding used on the interfering PDSCH. Therefore, there is no need to include precoding matrix subset restrictions in NAICS assistance signaling for DMRS based transmission modes (i.e., TMs 8, 9, and 10).

Finally, since studies in 3GPP have shown that NAICS with two CRS has good blind detection reliability and reasonable complexity, NAICS assistance subset restriction signaling need not be specified for two CRS ports. In general, NAICS assistance subset restriction signaling need only address the use of four CRS antenna ports and/or (CRS or DMRS based) spatial multiplexing transmission with more than two layers.

Thus, in some embodiments, NAICS assistance signaling using rank and/or precoding matrix subset restriction can then reflect any or any combination of the following behavior:

the UE may assume that spatial multiplexing with certain ranks is not used on interfering PDSCHs
  this applies to transmission modes that do not use PMI feedback (e.g., TM 3) as well as ones with PMI feedback (TMs 4, 5, 8, 9, and 10)
the maximum number of precoding matrices that the network can signal to the UE is less than the full codebook size
  the maximum number is known a priori by both the eNB and the UE
precoding matrices in the four CRS port codebook that require the $\sqrt{2}/2$ scaling factor may be excluded to reduce UE blind detection complexity
in a signaled subset of multiple ranks, the PMIs in rank n+1 are a subset of PMIs in rank n
precoding matrix subsets are only signaled for interferers using transmission modes with four CRS ports and PMI feedback (i.e., TMs 4, 5, and 6)
  precoding matrix subset restrictions are not needed for DMRS based TMs (i.e., TMs 8, 9, and 10)
the use of four CRS port transmit diversity is not restricted on interfering PDSCHs (through the assistance signaling)
assistance signaling is not provided for TMs 4, 5, and 6 with two CRS ports
a list of assistance information is provided, where
  each element of the list corresponds to one or more interfering PDSCHs
  each PDSCH may be identified by a scrambling ID or a physical cell ID that may be used to generate the PDSCH
  each element of the list constrains at least the number of spatially multiplexed layers on an interfering PDSCH
  in alternative embodiments assuming tightly synchronized transmitters, the interfering PDSCHs in the list are assumed to be quasi-collocated at least with respect to Doppler shift and Doppler spread with each other and with the serving PDSCH.

In some embodiments, the assistance information (sometimes referred to herein as NAICS assistance information) is provided from the cellular communications network to UEs using RRC signaling based on that used for LTE Release 8 codebook subset selection (Information Element (IE) codebookSubsetRestriction) and for CRS-IC (IE Neigh-CellsCRS-Info-), as described below. IEs not defined here are the same as those used in 3GPP LTE Release 11 standards. While RRC signaling is used in order to compactly express the assistance information in these embodiments, the assistance information could alternatively be signaled using a mixture of physical and higher layer specifications. Also, NAICS-AssistanceInfo can be extended to contain other IEs used to assist NAICS reception.

As illustrated in FIGS. 13A and 13B, in some embodiments, the assistance information provides information to assist NAICS functionality on PDSCH transmitted with any transmission mode. A physical cell ID (naics-physCellID) is provided, which can assist the UE to cancel/suppress an interferer using CRS based transmission modes, since the physical cell ID can identify the CRS associated with an interfering PDSCH and, therefore, the UE can perform channel estimation and demodulation for the interfering PDSCH. The scrambling IDs (naics-scrambling Identity and naics-scramblingIdentity2) allow the UE to receive the DMRS associated with an interfering PDSCH, and therefore to also perform channel estimation and demodulation for the interfering PDSCH. Note that two scrambling identities are provided, as this is consistent with a similar LTE Release 11 IE (DMRS-Config). If the second scrambling identity (naics-scrambling Identity2) is not needed in the signaling design, it can be omitted in an alternative embodiment. Since the network can configure different transmission modes on interfering cells, only one of the IEs for the physical cell ID and the two scrambling IDs need to be provided in a given NAICS-AssistanceInfo IE. Similarly, because interfering PDSCHs using TMs 4, 5, and 6 may not be present, pmiList is optional. The signaling ties the IDs to sets of TMs that the UE can expect are used on the interferer. This relationship reduces the effort the UE has to use to blind detect a physical channel associated with the ID, since the scrambling IDs and cell IDs have the same range (0 . . . 503), and knowing which TMs can be used allows the UE to know if it should search for, e.g., DMRS based or CRS based PDSCH transmissions.

The maximum rank that the UE may assume to be used for interfering PDSCH is provided in the IE nLayer. This maximum rank applies to naics-scramblingIdentity, naics-scramblingIdentity2, and naics-physCellId (when they are included in a given instance of NAICS-AssistanceInfo). Alternatively, NAICS-AssistanceInfo may not include nLayer in some alternative embodiments. In these alternative embodiments, the UE may assume that at most a maximum rank, preferably 2, is used for the interfering PDSCH indicated by naics-scramblingIdentity, naics-scramblingIdentity2, and naics-physCellId (when they are included in a given instance of NAICS-AssistanceInfo). Also, while nLayer in the embodiment is restricted to a maximum of 1 or 2 layers, in alternative embodiments, the values that nLayer can be set to can be any subset of 1, 2, 3, or 4 layers.

The subset of precoding matrices that a UE may assume can be used on a neighboring cell or transmission point are indicated using pmiList. Rather than redefining codebook subset restriction, the approach taken is to use the same structure, but to select from the low order bits of the codebook subset restriction for TM 4. In this first embodiment, a simple approach is taken where the PMIs in rank n+1 are the same as in rank n. Also, the precoding matrices with the $\sqrt{2}/2$ factor are excluded from the subset of matrices that can be used on the interferer. In an alternative embodiment, these precoding matrices can be kept (by eliminating the phrase "and bits $\{a_4 a_5 a_6 a_7\}$ are set to $\{0000\}$") if they are not needed to reduce UE blind detection complexity.

FIGS. 14A and 14B illustrate an alternative embodiment of the assistance information. This embodiment is similar to that of FIGS. 13A and 13B. In this embodiment, PMIs in rank n+1 are a subset of those in rank n. The only difference from the first embodiment illustrated in FIGS. 13A and 13B is that pmiList must be 32 bits long, and the tabular text for pmiList is a bit more involved.

FIGS. 15A and 15B illustrate a second alternative embodiment. In this alternative embodiment, PMIs can be set independently for each rank and the precoding matrices with the $\sqrt{2}/2$ factor are not excluded. The only difference from the embodiment of FIGS. 14A and 14B is that the restriction that rank 2 PMI matrices are subsets of rank 1 PMI matrices is removed and that the sentence referencing $\{a_4 a_5 a_6 a_7\}$ is not included.

FIGS. 16A and 16B illustrate an alternative to the embodiment of FIGS. 13A and 13B. In this embodiment, the network may be assumed to be tightly synchronized by the UE, as discussed above. In this case, the UE may further assume that CRS ports that are quasi-collocated with the serving PDSCH are quasi-collocated with the interfering PDSCHs identified by the signaling. This embodiment is the same as the first embodiment of FIGS. 13A and 13B, except that a quasi-collocation assumption is added to the naics-scramblingIdentity, and naics-scramblingIdentity2 IEs as shown.

Figure 17:
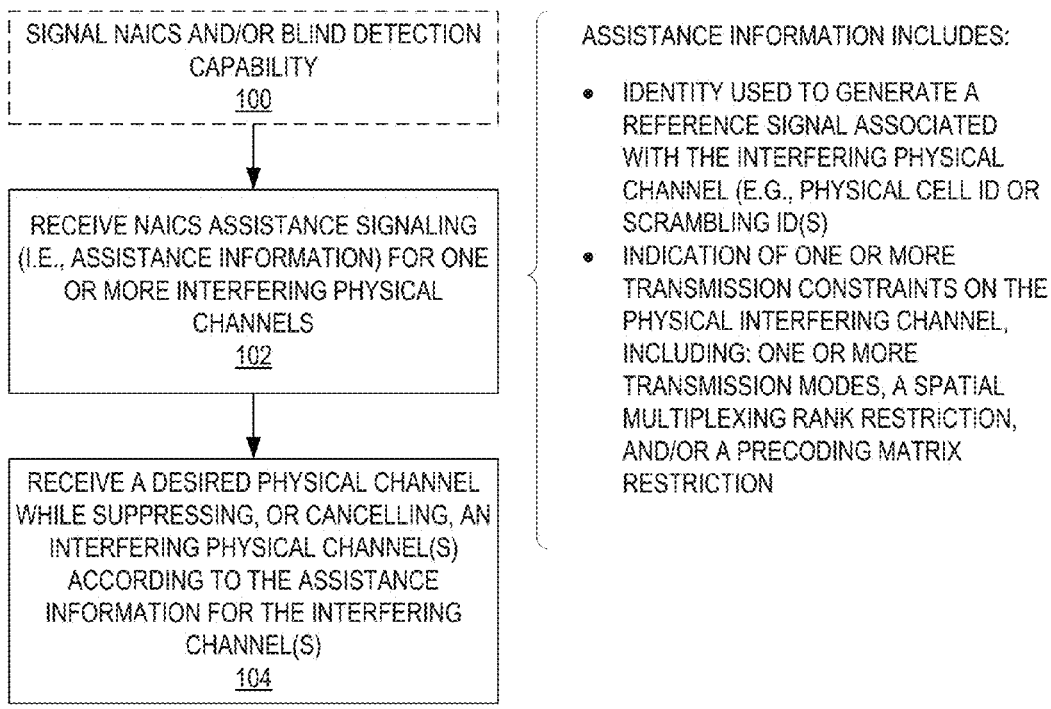
FIG. 17 is a flow chart that illustrates the operation of a UE to receive and utilize assistance information to assist the UE in the suppression or cancellation of an interfering physical channel according to some embodiments of the present disclosure.

FIGS. 13A through 16B illustrate various example embodiments of the assistance information that is signaled from the cellular communications network (e.g., from a base station or an eNB) to UEs having advanced receivers (e.g., NAICS receivers) according to some embodiments of the present disclosure. Now, the discussion turns to the functionality of UEs to receive and utilize the assistance information. In this regard, FIG. 17 is a flow chart that illustrates the operation of a UE, or a wireless device, to receive and utilize assistance information to assist the UE in the suppression or cancellation of an interfering physical channel (e.g., an interfering PDSCH) according to some embodiments of the present disclosure. As discussed above, in general, the assistance information provides rank and/or codebook subset (precoding matrix) restriction. This restriction reduces the number of rank and precoding matrix hypotheses that are searched or considered by the UE when blinding detecting the rank and/or PMI of an interfering physical channel (e.g., an interfering PDSCH). The detected rank and/or PMI of the interfering physical channel are then utilized by the receiver of the UE to suppress or cancel the interfering physical channel using NAICS functionality.

In particular, FIG. 17 is a high level flow chart of a method of operation of a NAICS UE 10 using rank and/or codebook subset restriction according to some embodiments of the present disclosure. The functions illustrated are those most directly related to rank and/or codebook subset restriction, and so other functions needed in general for NAICS receivers are not included. Furthermore, some steps may not be required in the exact order shown and/or can be implemented differently.

As illustrated, in some embodiments, the UE 10 indicates to the network that it is NAICS capable (step 100). A NAICS capable UE may be defined as one that estimates parameters of individual interferers and/or computes channel estimates of individual interferer's physical channels in order to improve receiver performance. A NAICS capable UE may be one that has been studied by 3GPP in 3GPP TR 36.866, according to one example.

Through an indication of blind detection capability, the UE 10 may also indicate that it can blindly detect certain interferer parameters that would otherwise need to be signaled in step 100. Such interferer parameters may include the interferer's cell ID, the number of CRS ports used by the interferer, the interferer's MBSFN configuration, the subset of TMs transmitted by the interferer, etc. This information may be useful to the network, as then it may not need to restrict transmissions in order to match the blind detection capability of the NAICS UE 10.

In other words, in some embodiments, the UE 10 provides an indication of a capability to receive a physical channel in the presence of interference from physical channels in the presence of interference from physical channels and to process indications of interfering physical channel constraints. Further, in some embodiments, this indication comprises an indication of a subset of interfering transmission modes.

The NAICS UE 10 receives NAICS assistance signaling (i.e., NAICS assistance information) for one or more interfering physical channels from the network (step 102). The NAICS signaling may configure the UE 10 for NAICS operation. However, in particular, the NAICS signaling provides NAICS assistance information containing parameters to be used by the UE 10 to operate its NAICS receiver. In some embodiments, the assistance information is as the assistance information described above. This assistance information may reduce the amount of blind detection the UE 10 has to perform, or if the parameters are impossible or infeasible to detect, such assistance may make NAICS operation feasible in the UE 10. The presence of such assistance information may indicate to the UE 10 that the network expects the UE 10 will use a NAICS receiver; additionally or alternatively explicit signaling may be used to configure the UE 10 for NAICS operation even if assistance parameters are not provided.

As described above, the assistance information signaled in step 102 may include parameters that indicate the set of ranks the interferer can use and/or the precoding matrices that the UE 10 may assume are used on the interferer. In other words, the assistance information includes rank and/or precoding matrix restrictions for one or more interfering channels (e.g., one or more interfering PDSCHs). More specifically, as described above, the assistance information may include, in some embodiments, an identity (e.g., physical cell identity or scrambling identity(ies) associated with the interfering physical channel. This identity may, in other words, be an identity used to generate a reference signal associated with the interfering physical channel. The assistance information also includes one or more transmission constraints on the interfering physical channel. The one or more transmission constraints may include one or more transmission modes associated with the identity that can be used for transmission of the interfering physical channel. Preferably, the transmission modes that can be used are less than all possible transmission modes. The one or more transmission constraints additionally or alternatively include a spatial multiplexing rank restriction and/or a precoding matrix restriction, as described above.

The UE 10 receives a desired physical channel while suppressing, or cancelling, the interfering physical channel(s) according to the assistance information for the interfering physical channel(s) (step 104). More specifically, the UE 10 uses the assistance information during blind detection of one or more transmission parameters of the interfering physical channel(s) (e.g., rank and/or PMI). Then, the NAICS receiver of the UE 10 receives the desired physical channel while suppressing or cancelling the interfering physical channel(s) using the detected transmission parameters. The details of the operation of the NAICS receiver and how it uses the transmission parameters are not the subject matter of the present disclosure and, as such, these details are not provided.

Figure 18:
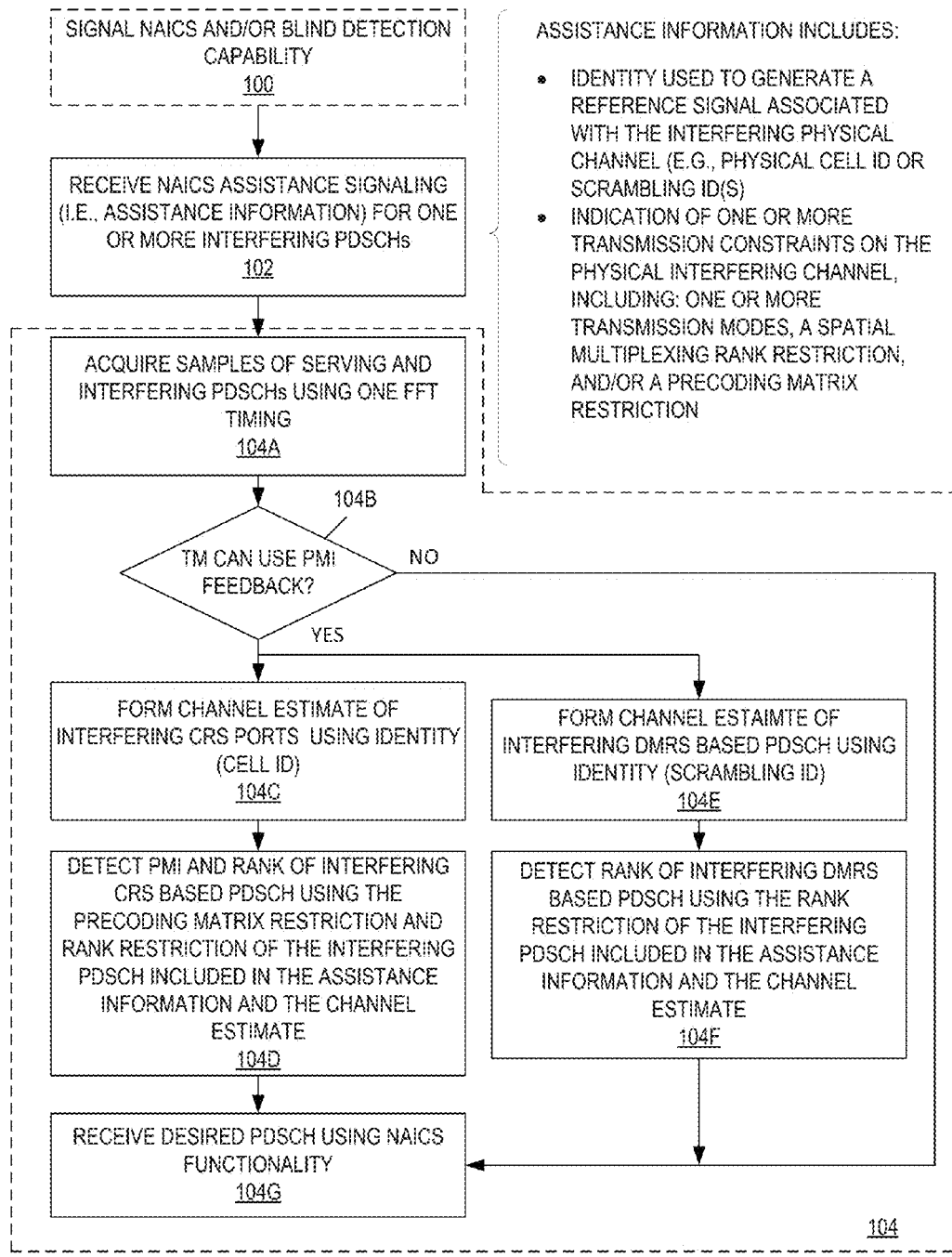
FIG. 18 is a more detailed illustration of the process of FIG. 17 according to some embodiments of the present disclosure.

FIG. 18 is the same as FIG. 17, but illustrates step 104 in more detail according to some embodiments of the present disclosure. For this example, the interfering physical channel(s) is(are) an interfering PDSCH(s). As illustrated, in order to receive the desired physical channel while suppressing or cancelling the interfering physical channel(s), the NAICS UE's receiver acquires samples comprising the serving, or desired, and interfering physical channels (step 104A). The receiver timing is preferably set such that the set of samples that the receiver uses in its FFT contains a full OFDM symbol of the serving and interfering PDSCHs, which may be referred to as using one FFT timing. Using one FFT timing simplifies NAICS receiver complexity, because only one FFT is used to receive a given serving PDSCH transmission. In order for the UE 10 to use one FFT timing, it is helpful (but not required, especially if the network is not sufficiently tightly frequency synchronized) if the network constrains transmission of the serving and interfering PDSCHs such that the UE 10 can assume that the CRS ports (that is, antenna ports 0-3) of a cell that are quasi-collocated with the serving PDSCH with respect to Doppler shift and Doppler spread are quasi-collocated with the CRS and/or DMRS (that is antenna ports 0-3 and/or 7-10) of the interfering PDSCH with respect to Doppler shift and Doppler spread.

The UE 10 determines whether the TM(s) that can be used for transmission of the interfering PDSCH can use PMI feedback (step 104B). In doing so, the UE 10 selects which blind detection algorithms it will use according to if the interfering PDSCH can use PMI feedback. TMs that can (but do not all necessarily always) use PMI feedback include TMs 4, 5, 6, 8, 9, and 10. If the TM of the interfering PDSCH for which the UE 10 will apply NAICS functionality cannot use PMI feedback, it is not necessary to blindly detect the PMI or the spatial multiplexing rank of the interfering PDSCH. As such, in this case, the process proceeds to step 104G.

If the TM of the interfering PDSCH does use PMI feedback, the UE 10 blindly detects the rank and/or PMI of the interfering PDSCH according to whether the interfering PDSCH is CRS based or DMRS based, as described below. In this regard, steps 104C and 104D are performed in parallel with steps 104E and 104F. Steps 104C and 104D operate according to the interfering PDSCH being CRS based, and steps 104E and 104F operate according to the interfering PDSCH being DMRS based. Herein, a CRS based PDSCH is one for which the PDSCH is transmitted using the same antenna ports as CRSs, while a DMRS based PDSCH is transmitted through the same antenna ports as DMRSs.

As illustrated, for CRS based PDSCH processing, the UE 10 forms a channel estimate of the CRS ports through which the interfering PDSCH is conveyed (step 104C). This corresponds to calculating H as described above. The UE 10 uses the physical cell ID of the CRS for this step. The physical cell ID may be the naics-physCellId received in the NAICS assistance signaling of step 102. The UE 10 blindly detects the precoding matrix used on the interfering PDSCH (and therefore its PMI) and the rank of the interfering PDSCH as described above (step 104D). If a PMI list is provided that the UE 10 may assume are used on the interfering PDSCH, the UE 10 only checks blind detection hypotheses of PMIs and ranks that the UE 10 may assume are used on the interfering PDSCH. The PMI list may be provided in assistance signaling received in step 102, for example using the IE pmiList. The ranks that the UE 10 may assume are preferably provided in the assistance signaling, for example using the IE nLayer. Thus, in other words, the UE 10 uses the rank and precoding matrix restrictions provided in the NAICS assistance information for the interfering PDSCH to reduce the search space when blinding detecting the rank and precoding matrix (and thus the PMI) of the interfering PDSCH. In this manner, the complexity of the blind detection is substantially reduced. The process then continues to step 104G.

Similarly, for DMRS based PDSCH processing, the UE 10 forms a channel estimate of the DMRS ports through which the interfering PDSCH is conveyed (step 104E). This corresponds to calculating G as described above. The UE 10 uses the scrambling ID of the DMRS associated with the interfering PDSCH for this step. The scrambling ID may be the ID naics-scrambling Identity or the ID naics-scramblingIdentity2 received in the NAICS assistance signaling in step 102. The UE 10 detects the rank of the interfering PDSCH using the channel estimate derived through the DMRS associated with the interfering PDSCH (step 104F). Methods described above may be used to detect the rank. The process then proceeds to step 104G.

In step 104G, whether proceeding from step 104B, 104D, or 104F, the UE 10 receives the serving PDSCH using NAICS functionality (step 104G). When proceeding from step 104D and 104F, the reception uses the detected rank and/or PMI according to NAICS receiver methods known in the art.

Figure 19:
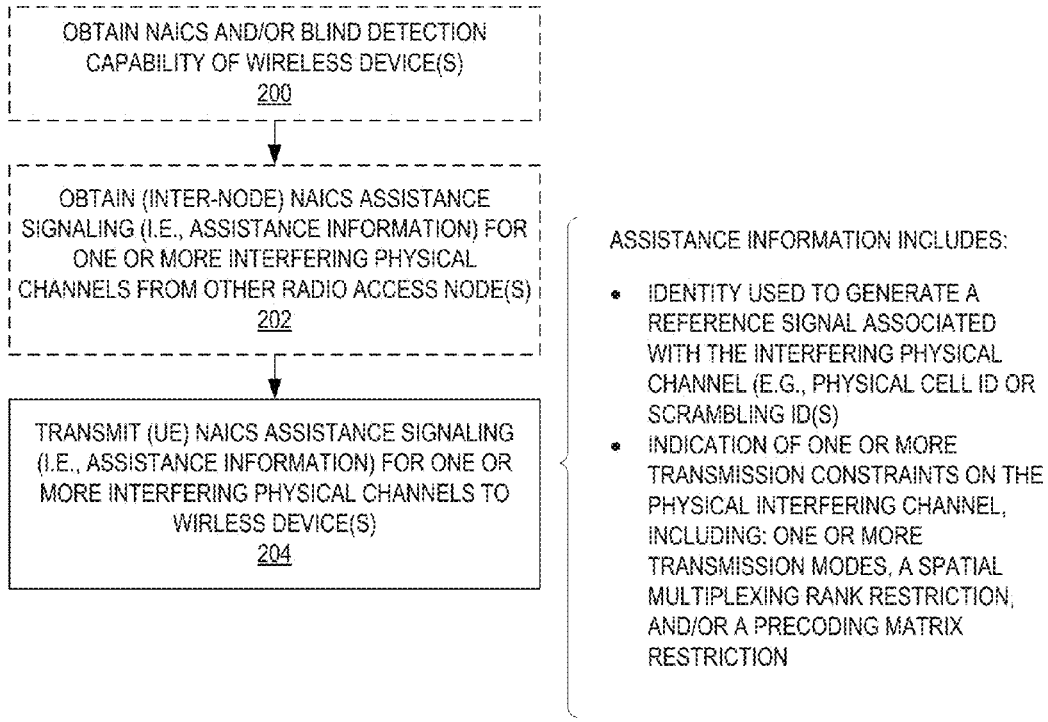
FIG. 19 illustrates the operation of a base station to transmit assistance information to UEs according to some embodiments of the present disclosure.

FIGS. 17 and 18 relate to the operation of the UE 10. The discussion now turns to the operation of a radio access node (e.g., a base station such as an eNB) according to some embodiments of the present disclosure. In this regard, FIG. 19 illustrates the operation of a base station 20 to transmit NAICS assistance information to UEs 10 according to some embodiments of the present disclosure. This process is equally applicable to other types of radio access nodes as well as LTE eNBs. As illustrated, in some embodiments, the base station 20 obtains NAICS and/or blind detection capability of a UE(s) 10, or wireless device(s), served by the base station 20 (step 200). The capabilities of the UE(s) 10 may be obtained via, for example, querying the UE(s) 10.

In some embodiments, the base station 20 also obtains NAICS assistance signaling (i.e., NAICS assistance information) for one or more interfering physical channels (e.g., one or more interfering PDSCHs) from one or more other radio access nodes (e.g., other base stations) (step 202). In this context, the NAICS assistance information is referred to herein as inter-node assistance information, as opposed to the NAICS assistance information transmitted to the UE(s) 10 which is referred to herein as UE assistance information. As discussed below, in some embodiments, the radio access nodes send NAICS assistance information to other radio access nodes for physical channels transmitted by those radio access nodes. For example, if a radio node utilizes one or more transmission constraints (e.g., rank and/or precoding matrix restriction) when transmitting a PDSCH, the radio node sends corresponding assistance information to other radio nodes, particularly those radio nodes' serving UEs 10 to which the transmitted PDSCH may be considered an interfering PDSCH.

The base station 20 transmits NAICS assistance signaling (i.e., NAICS assistance information) for one or more interfering physical channels to a UE(s) 10 served by the base station 20 (step 204). As discussed above, for each interfering physical channel, the NAICS assistance signaling includes, in some embodiments, an identity for the interfering physical channel and an indication of one or more transmission constraints on the transmission of the interfering physical channel. As discussed above, the identity for an interfering physical channel is an identity (e.g., a physical cell ID or scrambling ID(s)) used to generate a reference signal (e.g., CRS or DMRS) associated with the interfering physical channel. As also discussed above, the one or more transmission constraints include, in some embodiments, a listing of one or more TMs that can be used for transmission of the interfering physical channel, a rank restriction, and/or a precoding matrix restriction for the interfering physical channel. As discussed above with respect to step 202, the NAICS assistance information may be obtained by the base station 20 from other radio access nodes (i.e., the other radio access nodes that control transmission of the interfering physical channels).

Figure 20:
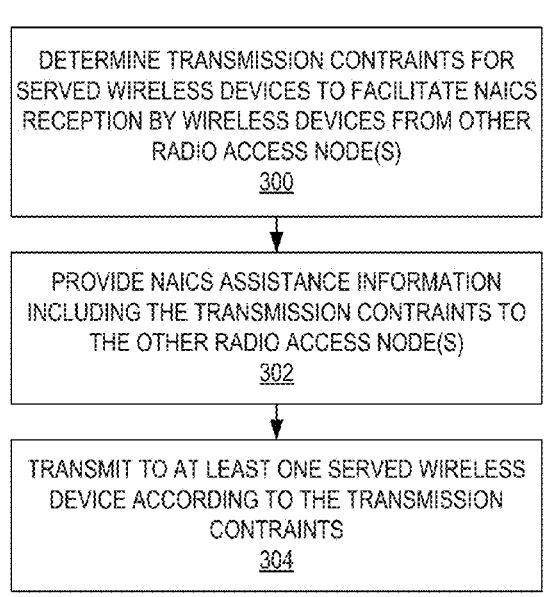
FIG. 20 illustrates the operation of a base station determine transmission constraints on the transmission of its own physical channel(s) to facilitate suppression or cancellation of the physical channel(s) during reception of another desired physical channel(s) by UEs served by other base stations according to some embodiments of the present disclosure.

FIG. 20 illustrates the operation of a base station 20 to determine transmission constraints on the transmission of its own physical channel(s) to facilitate NAICS reception of another desired physical channel(s) by UEs 10 served by other base stations 20 according to some embodiments of the present disclosure. This process is equally applicable to other types of radio access nodes as well as LTE eNBs. As illustrated, the base station 20 determines the physical channel transmission constraints that it will use to facilitate NAICS reception by UEs 10 served by neighboring cells or transmission points (step 300). Such constraints as those described above may be used. For example, the constraints may include the maximum number of layers to be used by the base station 20 for spatially multiplexed physical channels (i.e., a rank restriction), where the maximum number of layers may be used on a physical channel that is associated with a reference signal that is generated using an identity, and the identity is further associated with one or more transmission modes that the UE 10 may assume can be used on the physical channel. The constraints may further include the subset of precoding matrices in a codebook that a UE 10 may assume are used on a physical channel transmitted by the base station 20, wherein the number of precoding matrices signaled is less than the total number of precoding matrices in the codebook, and the physical channel is also associated with the reference signal generated using the identity. Additional constraints on how physical channels are to be transmitted by the base station 20 may also be determined. NAICS assistance information including the constraints and the identity are made available to the neighboring base stations 20 or transmission points using appropriate inter-node communication mechanisms (step 302). Notably, the term "radio access node" is sometimes used herein to generally refer to base stations 20 or transmission points. The base station 20 then transmits a physical channel to at least one UE according to the transmission constraints determined in step 300 (step 304). The eNB may also transmit to a second UE without constraints as is further described below with respect to step 416.

Figure 21:
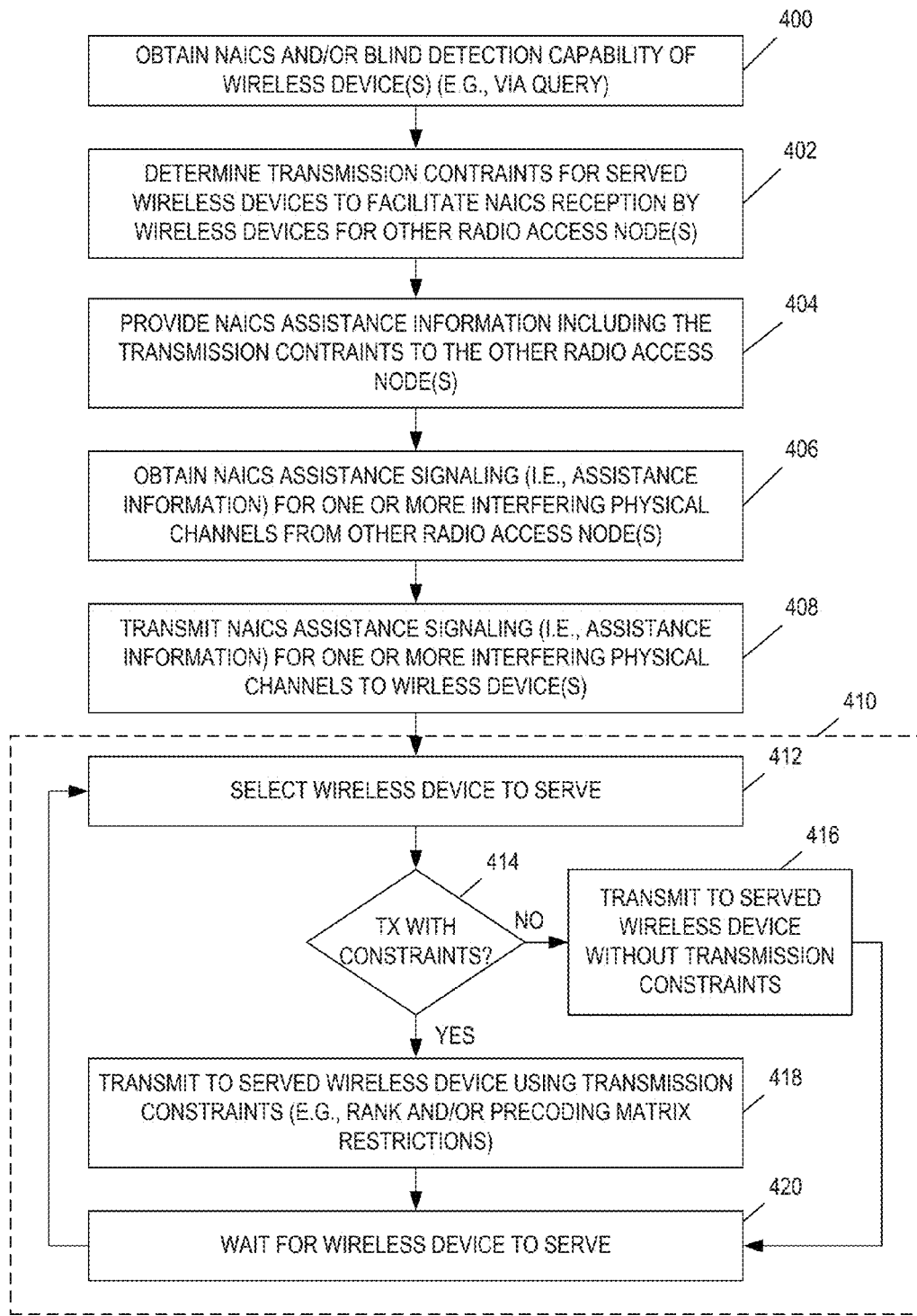
FIG. 21 is a flow chart that illustrates the operation of a base station according to some embodiments of the present disclosure.

FIG. 21 is a flow chart that illustrates the operation of a base station 20, which for this discussion is referred to as an eNB, that includes the functionality described above both with respect to FIG. 19 and FIG. 20, according to some embodiments of the present disclosure. FIG. 21 illustrates a high level flow chart of the operation of an eNB that provides assistance to NAICS UEs 10 using rank and/or codebook subset restriction. The functions illustrated are those most directly related to rank and/or codebook subset restriction, and so other functions needed in general for NAICS receiver assistance are not shown. Furthermore, some steps may not be required in the exact order shown and/or can be implemented differently.

The process begins by the eNB obtaining NAICS and/or blind detection capability of a UE(s) 10, e.g., via a query (step 400). Thus, in some embodiments, the eNB transmits a query to a UE 10 asking if the UE 10 is NAICS capable. The UE 10 responds with an indication of whether it is NAICS capable. This step may be performed for all UEs 10 served by the eNB. The eNB determines the physical channel transmission constraints that it will use to facilitate NAICS reception by UEs 10 served by neighboring cells or transmission points (step 402). Such constraints as those described above may be used. For example, the constraints may include the maximum number of layers to be used by the eNB for spatially multiplexed physical channels, where the maximum number of layers may be used on a physical channel that is associated with a reference signal that is generated using an identity, and the identity is further associated with one or more TMs that the UE 10 may assume can be used on the physical channel. The constraints may further include the subset of precoding matrices in a codebook that a UE 10 may assume are used on a physical channel transmitted by the eNB, wherein the number of precoding matrices signaled is less than the total number of precoding matrices in the codebook, and the physical channel is also associated with the reference signal generated using the identity. Additional constraints on how physical channels are to be transmitted by the eNB may also be determined. As discussed above, the eNB provides the NAICS assistance information including the constraints and the identity to neighboring eNBs or transmission points using appropriate inter-node communication mechanisms (step 404).

The eNB determines or otherwise obtains and transmits the NAICS assistance signaling to UE(s) 10 served by the eNB, as discussed above (steps 406 and 408). The eNB determines NAICS assistance signaling using the constraints provided to it that are determined for other eNBs or transmission points from step 402 when performed by those other eNBs or transmission points. The eNB then uses the constraints, or NAICS assistance information, obtained from the other eNBs or transmission points to determine the NAICS assistance information to be transmitted to the UEs 10 served by the eNB. For instance, the NAICS assistance information to be transmitted by the eNB to the UEs 10 served by the eNB may be an aggregation of the NAICS assistance information obtained from the other eNBs or transmission points, which includes the transmission constraints on the physical channels transmitted by those other eNBs or transmission points. The eNB then transmits the assistance signaling to NAICS UEs 10 that it serves and that require the assistance signaling. The assistance signaling is preferably that which is described above, according to this example. Such signaling preferably at least comprises the interfering PDSCH scrambling IDs, physical cell ID, and/or rank, which may be indicated by the IE naics-scramblingIdentity, naics-scramblingIdentity2, naics-physCellId, and nLayer, respectively. The parameters, or transmission constraints, may additionally comprise a list of precoding matrices that the UE 10 may assume are used on an interfering physical channel.

The eNB then transmits its own physical channels to the UEs 10 served by the eNB according to its own transmission constraints determined in step 402 (step 410). More specifically, the eNB selects a UE 10 (the served UE) that it will serve from the set of UEs 10 to which it may transmit a physical channel and that is ready to receive a transmission (step 412). The eNB determines if it should transmit to the served UE 10 using the constraints determined in step 402 (step 414). In some embodiments, the determination of step 414 includes determining whether UEs 10 in neighboring cells do not require the constraints while the eNB transmits to the served UE 10. In addition or alternatively, the eNB may consider lag in communication of the transmission constraints from the eNB to the radio access nodes controlling the neighboring cells (i.e., the lag in base-station-to-base-station signaling (e.g., X2 signaling)) and/or a lag in communication of the transmission constraints to the UEs 10 in the neighboring cells (e.g., a lag in RRC signaling). The eNB may also decide to override the transmission constraints based on any suitable or desirable criteria. If UEs 10 in neighboring cells do not require the constraints while the eNB transmits to the served UE 10 (or if the eNB otherwise determines that it should transmit to the served UE 10 without using the constraints), the eNB proceeds to step 416 where the eNB transmits the physical channel to the UE 10 without the transmission constraints (step 416). Cases where the neighboring cells do not require the constraints include for which assistance signaling is not provided, such as for two CRS port transmission, transmit diversity using four CRS ports, TM 1, etc. If UEs 10 in neighboring cells do require the constraints, the eNB may proceed to step 418 if it determines the constraints are acceptable while it transmits to the served UE 10. If the constraints are not acceptable, it again proceeds to step 416.

If the eNB determines that it is to transmit the physical channel (e.g., PDSCH) to the served UE 10 using the constraints determined in step 402, the eNB transmits the physical channel to the UE 10 using the transmission constraints (step 418). The rank constraints, or restrictions, are preferably at least used. The precoding matrix constraints may also be used if the TM of a PDSCH to be transmitted to the served UE 10 supports transmission with a specified precoding matrix (for example, TM 4). Lastly, whether proceeding from step 416 or step 418, the eNB waits for another UE 10 to serve (step 420). When another UE 10 is to be served, the process returns to step 412 and is repeated.

As a result of the forgoing exemplary embodiments, UE 10 complexity is reduced, and blind detection reliability is increased. The rank of the precoding matrices used to transmit interference is restricted (preferably to rank 2). This reduces the effort to search for the interfering precoding matrices by at least a factor of 2. Also, the number of precoding matrices the UE 10 must blindly detect for each rank is reduced. Moreover, a given precoding matrix is used for all valid interferer ranks, which further reduces the number of precoding matrices the UE 10 must search for over all ranks. The subsets can be adapted to match eNB antenna configurations or radio channel conditions, and so performance loss from subset restriction is limited.

While processes in the figures may show a particular order of operations performed by certain embodiments of the disclosure, it should be understood that such order is exemplary (e.g., alternative embodiments may perform the operations in a different order, combine certain operations, overlap certain operations, etc.).

Figure 22:
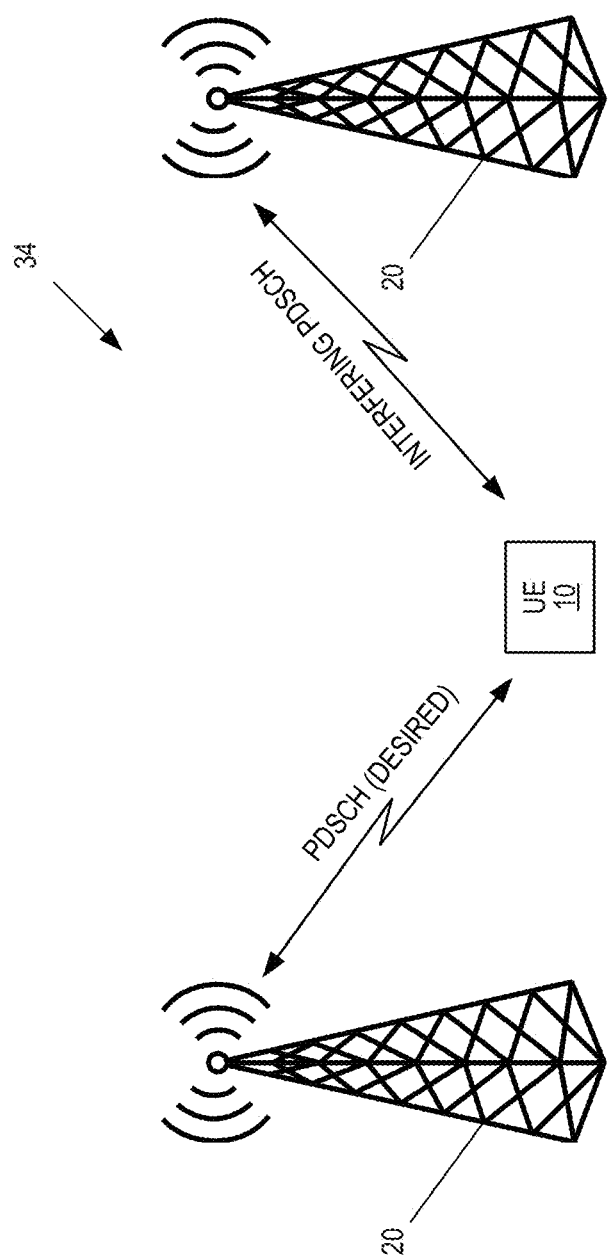
FIG. 22 illustrates one example of a cellular communications network according to some embodiments of the present disclosure.

The base station 20 and the UE 10 described above can be implemented in any suitable type of cellular communications network. In this regard, FIG. 22 illustrates one example of a cellular communications network 34 including a number of base stations 20. In this example, the cellular communications network 34 is an LTE network, and the base stations 20 are eNBs. As illustrated, the UE 10 has an NAICS receiver that operates to suppress or cancel an interfering PDSCH from one of the base stations 20 during reception of a desired PDSCH from the other one of the base stations 20, which is referred to as the serving base station 20 of the UE 10. As discussed above, the UE 10 receives NAICS assistance information from the serving base station 20 that includes information that assists with the NAICS functionality of the receiver of the UE 10. In particular, the NAICS assistance information includes information reduces the complexity of blind detection of one or more transmission parameters (e.g., rank and/or PMI) used for transmission of the interfering PDSCH. The NAICS receiver uses the detected transmission parameter(s) to suppress or cancel the interfering PDSCH during reception of the desired PDSCH using any suitable NAICS functionality.

Figure 23:
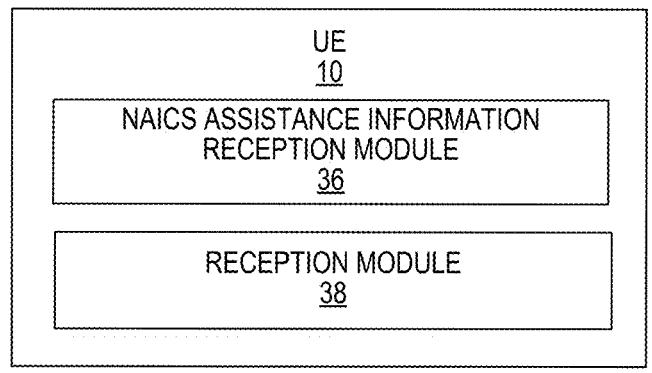
FIG. 23 is a block diagram of a UE according to some embodiments of the present disclosure.
Figure 24:
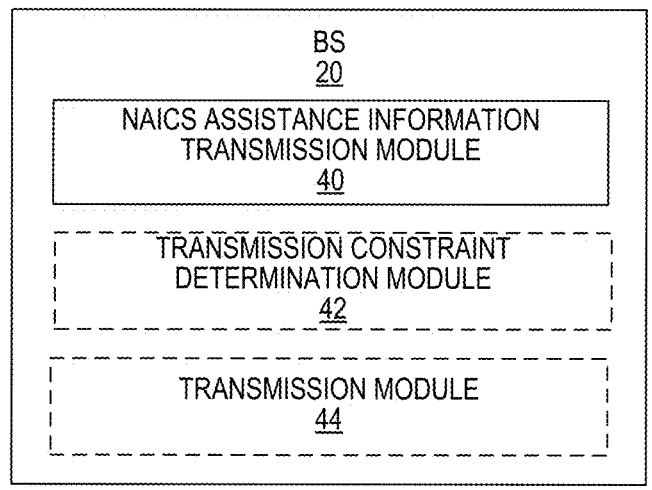
FIG. 24 is a block diagram of a base station according to some embodiments of the present disclosure.

While FIGS. 1 and 2 illustrate the UE 10 and the base station 20, respectively, according to some embodiments of the present disclosure, FIGS. 23 and 24 illustrate the UE 10 and the base station 20, respectively, according to some other embodiments of the present disclosure. As illustrated in FIG. 23, in some embodiments, the UE 10 includes a NAICS assistance information reception module 36 and a reception module 38, each of which is implemented in software. The NAICS assistance information reception module 36 operates to receive, via an associated receiver of the UE 10 (not shown), NAICS assistance information, as described above. The reception module 38 then uses the NAICS assistance information to suppress or cancel an interfering physical channel(s) during reception of a desired physical channel using NAICS functionality.

In some embodiments, a computer program including instructions which, when executed by at least one processor, causes the at least one processor to carry out the functionality of the UE 10 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory).

As illustrated in FIG. 24, in some embodiments, the base station 20 includes a NAICS assistance information transmission module 40 and, in some embodiments, a transmission constraint determination module 42 and a transmission module 44, each of which is implemented in software. The NAICS assistance information transmission module 40 operates to transmit, via an associated transmitter of the base station 20 (not shown), NAICS assistance information, as described above. The transmission constraint determination module 42 operates to determine one or more transmission constraints for transmission of a physical channel by the base station 20 and provides these constraints to other radio access nodes (e.g., other base stations) via an appropriate interface of the base station 20 (not shown). The transmission module 44 operates to apply the one or more transmission constraints during transmission of a physical channel by the base station 20 using the associated transmitter of the base station 20.

In some embodiments, a computer program including instructions which, when executed by at least one processor, causes the at least one processor to carry out the functionality of the base station 20 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory).

As discussed above, the present disclosure is directed to providing solutions to one or more problems presented in the prior art. Further features and advantages will become apparent to one of ordinary skill in the art, in view of the following detailed description and figures.

An embodiment described herein is directed to a method of indicating one or more interfering physical channel transmission constraints. The method may include indicating an identity used to generate a reference signal associated with an interfering physical channel; indicating whether the identity is associated with one or more specific physical channel transmission modes; and indicating whether a maximum number of layers may be assumed if the interfering physical channel is transmitted using spatial multiplexing.

Another embodiment described herein is directed to a method of indicating one or more interfering physical channel transmission constraints. The method may include indicating an identity used to generate a reference signal associated with an interfering physical channel; and indicating a subset of precoding matrices in a codebook assumed to be used on the interfering physical channel. According to an embodiment, a maximum number of precoding matrices in the subset of precoding matrices is less than a number of precoding matrices in the codebook, and the interfering physical channel is transmitted using a precoding matrix in the codebook.

Yet another embodiment is directed to a method of receiving in a wireless communications system. The method may comprise providing an indication of a capability to receive a physical channel in the presence of interference from physical channels and to process one or more indications of interfering physical channel constraints; receiving an indication of one or more interfering physical channel transmission constraints, comprising at least an identity used to generate a reference signal associated with an interfering physical channel, wherein the identity is associated with one or more physical specific channel transmission modes, and an indication that a maximum number of layers may be assumed if the interfering physical channel is transmitted using spatial multiplexing; and receiving a physical channel in the presence of an interfering physical channel transmitted according to the one or more constraints.

Yet another embodiment is directed to a method of receiving in a wireless communications system. The method may include receiving an indication of interfering physical channel transmission constraints, comprising at least an identity used to generate a reference signal associated with an interfering physical channel; and receiving an indication of a subset of precoding matrices in a codebook that may be assumed to be used on the interfering physical channel. According to certain embodiments, a maximum number of precoding matrices in the subset of precoding matrices is less than a number of precoding matrices in the codebook, and the interfering physical channel is transmitted using a precoding matrix in the codebook.

It should be noted that various systems, nodes, UEs, and base stations can be employed to include functionality capable of performing the features described above.

While the disclosed features have been described in terms of several embodiments, those skilled in the art will recognize that the disclosure is not limited to the embodiments described, can be practiced with modification and alteration within the spirit and scope of the appended claims. The description is thus to be regarded as illustrative instead of limiting.

The following acronyms are used throughout this disclosure.

3GPP 3$^{rd}$ Generation Partnership Project
AP Access Point
ASIC Application Specific Integrated Circuit
AWGN All White Gaussian Noise
BSC Base Station Controller
BTS Base Transceiver Station
CA Carrier Aggregation
CC Component Carrier
CDMA Code Division Multiple Access
CPU Central Processing Unit
CRS Common Reference Signal
CRS-IC Common Reference Signal Interference Cancellation
CSI Channel State Information
D2D Device-to-Device
DAS Distributed Antenna System
DMRS Demodulation Reference Signal
DRX Discontinuous Reception
E-IRC Error Interference Rejection Combining
E-SMLC Evolved Serving Mobile Location Centre
EDGE Enhanced Data Rates for Global System for Mobile Communications Evolution
eNB Enhanced or Evolved Node B
ePDCCH Enhanced Physical Downlink Control Channel
FeICIC Further Enhanced Inter-Cell Interference Coordination
FFT Fast Fourier Transform
FPGA Field Programmable Gate Array
FTP File Transfer Protocol
GERAN Global System for Mobile Communications Enhanced Data Rates for Global System for Mobile Communications Evolution Radio Access Network
GPS Global Positioning System
GSM Global System for Mobile Communications
HPN High Power Node
HRPD High Rate Packed Data
HSPA High Speed Packet Access
ID Identifier
IE Information Element
IRC Interference Rejection Combining
LEE Laptop Embedded Equipment
LME Laptop Mounted Equipment
LPN Low Power Node
LTE Long Term Evolution
M2M Machine-to-Machine
Mbps/km2 Megabits per Second per Square Kilometer
MBSFN Multicast-Broadcast Single-Frequency Network
Mbyte Megabyte
MDT Minimization of Drive Tests
MME Mobility Management Entity
ms Millisecond MSC Mobile Switching Centre
MSR Multi-Standard Radio
MTC Machine-Type Communications
NAICS Network Assisted Interference Cancellation and Suppression
O&M Operation and Management
OFDM Orthogonal Frequency Division Multiplexing
OLLA Outer Loop Link Adaptation
OSS Operations Support System
PBCH Physical Broadcast Channel
PCC Primary Component Carrier
PCell Primary Cell
PCFICH Physical Control Format Indicator Channel
PDA Personal Digital Assistant
PDCCH Physical Downlink Control Channel
PDSCH Physical Downlink Shared Channel
PHICH Physical Hybrid Automatic Repeat Request Indicator Channel
PMCH Physical Multicast Channel
PMI Precoding Matrix Indicator
PRB Physical Resource Block
PSC Primary Serving Cell
RAN Radio Access Network
RNC Radio Network Controller
RRC Radio Resource Control
RRH Remote Radio Head
RRU Remote Radio Unit
SCC Secondary Component Carrier
SCell Secondary Cell
SFBC Space Frequency Block Coding
SLIC Symbol Level Interference Cancellation
SON Self-Organizing Network
SSC Secondary Serving Cell
TDM Time Division Multiplexing
TM Transmission Mode
TR Technical Report
TS Technical Specification
UE User Equipment
USB Universal Serial Bus
UTRAN Universal Terrestrial Radio Access Network
VOIP Voice Over Internet Protocol
VPN Virtual Private Network
WCDMA Wideband Code Division Multiple Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device to assist with suppression of an interfering physical channel during reception of a desired physical channel, comprising:
   receiving assistance information for an interfering physical channel, the assistance information comprising:
      an identity used to generate a reference signal associated with the interfering physical channel; and
      information indicative of one or more transmission constraints on transmission of the interfering physical channel, the one or more transmission constraints comprising at least one of a group consisting of:
   a spatial multiplexing rank restriction and a precoding matrix restriction; and
   receiving a desired physical channel while suppressing the interfering physical channel according to the assistance information for the interfering physical channel.

2. The method of claim 1 wherein the one or more transmission constraints comprise the spatial multiplexing rank restriction.

3. The method of claim 2 wherein the spatial multiplexing rank restriction defines a number of spatial multiplexing layers that the wireless device can assume are, at most, present on the interfering physical channel, where the number of spatial multiplexing layers defined by the spatial multiplexing rank restriction is less than a maximum number of spatial multiplexing layers that could be used to transmit the interfering physical channel.

4. The method of claim 2 further comprising providing an indication of a capability to receive a physical channel in the presence of interference from physical channels and to process indications of interfering physical channel constraints.

5. The method of claim 4 wherein the indication of a capability to receive a physical channel in the presence of interference from physical channels and to process indications of interfering physical channel constraints comprises a subset of interfering transmission modes.

6. The method of claim 1 wherein the one or more transmission constraints comprise the precoding matrix restriction.

7. The method of claim 6 wherein the precoding matrix restriction defines a subset of a set of precoding matrices, and:
   the set of precoding matrices comprises all precoding matrices that could be used to transmit the interfering physical channel;
   the subset of the set of precoding matrices being less than all precoding matrices in the set of precoding matrices; and
   the subset of the set of precoding matrices defining precoding matrices that the wireless device can assume are the only precoding matrices that can be used for transmission of the interfering physical channel.

8. The method of claim 1 wherein the one or more transmission constraints comprise the spatial multiplexing rank restriction and the precoding matrix restriction.

9. The method of claim 1 wherein the one or more transmission constraints further comprise a transmission mode constraint.

10. The method of claim 1 wherein the identity is a physical cell identity.

11. The method of claim 1 wherein the identity is a scrambling identity.

12. The method of claim 1 wherein the interfering physical channel is an interfering Long Term Evolution, LTE, Physical Downlink Shared Channel, PDSCH, and the desired physical channel is a desired PDSCH.

13. The method of claim 12 wherein receiving assistance information comprises receiving the assistance information via Radio Resource Control, RRC, signaling.

14. The method of claim 12 wherein the one or more transmission constraints comprise the spatial multiplexing rank restriction and the precoding matrix restriction, and receiving the desired physical channel while suppressing the interfering physical channel according to the assistance information for the interfering physical channel, comprises:
   forming a channel estimate of one or more interfering Common Reference Signal, CRS, ports using a physical cell identity that corresponds to the identity of the interfering PDSCH;
   detecting a Precoding Matrix Indicator, PMI, and a spatial multiplexing rank of the interfering PDSCH using the precoding matrix restriction, the spatial multiplexing rank restriction, and the channel estimate; and receiving the desired PDSCH while suppressing the interfering PDSCH according to the PMI and the spatial multiplexing rank of the interfering PDSCH detected using the precoding matrix restriction, the spatial multiplexing rank restriction, and the channel estimate.

15. The method of claim 14 wherein the one or more transmission constraints further comprise a transmission mode constraint associated with the identity, and the method further comprises:

determining whether one or more transmission modes that can be used for transmission of the interfering physical channel as indicated by the transmission mode constraint can use PMI feedback;

wherein forming the channel estimate, detecting at least one of the PMI and the spatial multiplexing rank of the interfering PDSCH, and receiving the desired PDSCH while suppressing the interfering PDSCH are performed upon determining that the one or more transmission modes associated with the identity can use PMI feedback.

16. The method of claim 12 wherein the one or more transmission constraints comprise a spatial multiplexing rank restriction, and receiving the desired physical channel while suppressing the interfering physical channel according to the assistance information for the interfering physical channel, comprises:

forming a channel estimate using a scrambling identity of one or more interfering Demodulation Reference Signal, DMRS, ports, where the scrambling identity corresponds to the identity used to generate DMRS associated with the interfering PDSCH;

detecting a spatial multiplexing rank of the interfering PDSCH using the spatial multiplexing rank restriction and the channel estimate; and receiving the desired PDSCH while suppressing the interfering PDSCH according to the spatial multiplexing rank of the interfering PDSCH detected using the spatial multiplexing rank restriction and the channel estimate.

17. The method of claim 1 wherein the interfering physical channel is assumed by the wireless device to be quasi-collocated at least with respect to Doppler shift and Doppler spread with the desired physical channel.

18. A wireless device assisted to suppress an interfering physical channel during reception of a desired physical channel, comprising:

a transceiver module;

a processing module; and a memory module storing software executable by the processing module whereby the wireless device is operative to:

receive assistance information for an interfering physical channel, the assistance information comprising:

an identity used to generate a reference signal associated with the interfering physical channel; and information indicative of one or more transmission constraints on transmission of the interfering physical channel, the one or more transmission constraints comprising at least one of a group consisting of: a spatial multiplexing rank restriction and a precoding matrix restriction; and receive a desired physical channel while suppressing the interfering physical channel according to the assistance information for the interfering physical channel.

19. A method of operation of a radio access node to assist with suppression of an interfering physical channel during reception of a desired physical channel at a wireless device, comprising:

transmitting assistance information to the wireless device for an interfering physical channel, the assistance information comprising:

an identity used to generate a reference signal associated with the interfering physical channel; and information indicative of one or more transmission constraints on transmission of the interfering physical channel, the one or more transmission constraints comprising at least one of a group consisting of:

a spatial multiplexing rank restriction and a precoding matrix restriction.

20. The method of claim 19 further comprising receiving by the radio access node an indication of a capability for the wireless device to receive a physical channel in the presence of interference from physical channels and to process indications of interfering physical channel constraints.

21. The method of claim 20 wherein the indication of a capability for the wireless device to receive a physical channel in the presence of interference from physical channels and to process indications of interfering physical channel constraints comprises a subset of interfering transmission modes.

22. The method of claim 19 wherein the one or more transmission constraints comprise the spatial multiplexing rank restriction.

23. The method of claim 22 wherein the spatial multiplexing rank restriction defines a number of spatial multiplexing layers that the wireless device can assume are, at most, present on the interfering physical channel, where the number of spatial multiplexing layers defined by the spatial multiplexing restriction is less than a maximum number of spatial multiplexing layers that could be used to transmit the interfering physical channel.

24. The method of claim 22 wherein the interfering physical channel is a Demodulation Reference Signal, DMRS, based Physical Downlink Shared Channel, PDSCH, and the one or more transmission constraints do not comprise the precoding matrix restriction.

25. The method of claim 19 wherein the one or more transmission constraints comprise the precoding matrix restriction.

26. The method of claim 25 wherein the precoding matrix restriction defines a subset of a set of precoding matrices, and:

the set of precoding matrices comprises all precoding matrices that could be used to transmit the interfering physical channel;

the subset of the set of precoding matrices being less than all precoding matrices in the set of precoding matrices; and the subset of the set of precoding matrices defining precoding matrices that the wireless device can assume are the only precoding matrices that can be used for transmission of the interfering physical channel.

27. The method of claim 26 wherein the set of precoding matrices comprises precoding matrices with a scaling factor of $\sqrt{2}/2$, and the subset of the set of precoding matrices excludes the precoding matrices with the scaling factor of $\sqrt{2}/2$.

28. The method of claim 25 wherein the interfering physical channel is a Common Reference Signal, CRS, based Physical Downlink Shared Channel, PDSCH.

29. The method of claim 19 wherein the one or more transmission constraints comprise the spatial multiplexing rank restriction and the precoding matrix restriction.

30. The method of claim 29 wherein the spatial multiplexing rank restriction and the precoding matrix restriction are such that precoding matrix indices in rank n are a subset of precoding matrix indices in rank n+1.

31. The method of claim 19 wherein the one or more transmission constraints further comprise a transmission mode constraint associated with the identity.

32. The method of claim 19 wherein the identity is a physical cell identity.

33. The method of claim 19 wherein the identity is a scrambling identity.

34. The method of claim 19 wherein the interfering physical channel is an interfering Long Term Evolution, LTE, Physical Downlink Shared Channel, PDSCH, and the desired physical channel is a desired PDSCH.

35. The method of claim 34 wherein transmitting assistance information comprises transmitting the assistance information via Radio Resource Control, RRC, signaling.

36. A method of operation of a first radio access node in a cellular communications network to assist suppression of an interfering physical channel transmitted by a second radio access node during reception of a desired physical channel at a wireless device served by the first radio access node, comprising:
obtaining inter-node assistance information from the second radio access node from which the interfering physical channel is transmitted, the inter-node assistance information comprising information indicative of one or more transmission constraints on transmission of the interfering physical channel by the second radio access node; and
transmitting wireless device assistance information to the wireless device for the interfering physical channel, the wireless device assistance information comprising information indicative of the one or more transmission constraints on transmission of the interfering physical channel by the second radio access node.

37. The method of claim 36, wherein the inter-node assistance information further comprises an identity used to generate a reference signal associated with the interfering physical channel.

38. The method of claim 36, wherein the one or more transmission constraints comprise at least one of a group consisting of: a spatial multiplexing rank restriction and a precoding matrix restriction.

39. The method of claim 36 wherein the one or more transmission constraints comprise a transmission mode constraint.

40. A method of operation of a first radio access node in a cellular communications network to assist suppression of a physical channel transmitted by the first radio access node during reception of a desired physical channel at a wireless device served by a second radio access node, comprising:
determining transmission constraints for wireless devices served by the first radio access node;
providing, to the second radio access node, inter-node assistance information for suppression of the physical channel as interference during reception at the wireless device served by the second radio access node, the inter-node assistance information provided to the second radio access node comprising information indicative of the transmission constraints for the wireless devices served by the first radio access node.

41. The method of claim 40 wherein the transmission constraints comprise at least one of a group consisting of: a spatial multiplexing rank restriction for the physical channel transmitted by the first radio access node and a precoding matrix restriction for the physical channel transmitted by the first radio access node.

42. The method of claim 40 wherein the inter-node assistance information further comprises an identity used to generate a reference signal associated with the physical channel transmitted by the first radio access node.

43. The method of claim 40 further comprising transmitting the physical channel from the first radio access node according to the one or more transmission constraints on transmission of the physical channel.

44. The method of claim 40 further comprising transmitting the physical channel from the first radio access node in a manner different from the transmission constraints on transmission of the physical channel.

45. A radio access node that assists with suppression of an interfering physical channel during reception of a desired physical channel at a wireless device, comprising:
a transceiver module;
a processing module; and
a memory module storing software executable by the processing module whereby the radio access node is operative to transmit assistance information to a wireless device for an interfering physical channel, the assistance information comprising:
an identity used to generate a reference signal associated with the interfering physical channel; and
information indicative of one or more transmission constraints on transmission of the interfering physical channel, the one or more transmission constraints comprising at least one of a group consisting of:
a spatial multiplexing rank restriction and a precoding matrix restriction.

* * * * *